US005626712A

United States Patent [19]

Lisec

[11] Patent Number: 5,626,712

[45] Date of Patent: May 6, 1997

[54] DEVICE FOR FILLING INSULATING GLASS PANES WITH HEAVY GAS

[76] Inventor: Peter Lisec, Bahnhofstrasse 34, A-3363 Amstetten-Hausmening, Austria

[21] Appl. No.: 410,307

[22] Filed: Mar. 24, 1995

[30] Foreign Application Priority Data

| | | | |
|---|---|---|---|
| Mar. 24, 1994 | [AT] | Austria | 628/94 |
| Mar. 24, 1994 | [AT] | Austria | 631/94 |
| Jun. 17, 1994 | [AT] | Austria | 1204/94 |
| Sep. 13, 1994 | [AT] | Austria | 1749/94 |

[51] Int. Cl.$^6$ .......... E06B 3/677; B65G 47/00

[52] U.S. Cl. .......... 156/497; 141/59; 141/165; 141/168; 141/231; 156/109; 156/145; 156/538; 198/570; 198/860.3

[58] Field of Search .......... 156/99, 104, 109, 156/107, 285, 145, 292, 382, 497, 356, 538, 574; 198/836.1, 570, 860.3; 141/4, 59, 129, 165, 168, 231, 232, 177

[56] References Cited

U.S. PATENT DOCUMENTS

| | | | |
|---|---|---|---|
| 4,909,874 | 3/1990 | Rueckheim | 156/109 |

FOREIGN PATENT DOCUMENTS

| | | |
|---|---|---|
| 368985 | 11/1982 | Austria . |
| 370201 | 3/1983 | Austria . |
| 370706 | 4/1983 | Austria . |
| 2956/87 | 11/1987 | Austria . |
| 385499 | 4/1988 | Austria . |
| 0444391 | 9/1994 | European Pat. Off. . |
| 3101342A1 | 7/1982 | Germany . |
| 3115566 | 10/1982 | Germany . |
| 3139856 | 12/1982 | Germany . |
| 3101342C2 | 8/1984 | Germany . |
| 3130645 | 6/1985 | Germany . |
| 3914706 | 12/1989 | Germany . |
| 4022185 | 1/1992 | Germany . |
| 4202612 | 8/1992 | Germany . |
| 9302744.3 | 6/1994 | Germany . |
| 4307403 | 9/1994 | Germany . |

*Primary Examiner*—Michael W. Ball
*Assistant Examiner*—Francis J. Lorin
*Attorney, Agent, or Firm*—Young & Thompson

[57] ABSTRACT

In a device for filling with heavy gas insulating glass panes (10) which are not yet pressed, there is a seal means (80) which can be moved between the plates of the device and which is movably guided via carriages (90, 91) on guide rails (92, 93) mounted on one of the plates (2). The seal (80) can be swivelled by a drive (100) around a horizontal axis (99) so that it is can be swivelled from a position in which it encloses an acute angle with a front side (102) of the plate (2), in which position it is pushed along the plate (2) into its active position in which it is aligned parallel to the front side (102) of the plate (2). The seal on the downstream side edge of the plates can move via parallelogram connecting rods so that it can be moved from a readiness position located next to the plates into a sealing position which adjoins the vertical edges of the plates.

16 Claims, 16 Drawing Sheets

FIG. 3
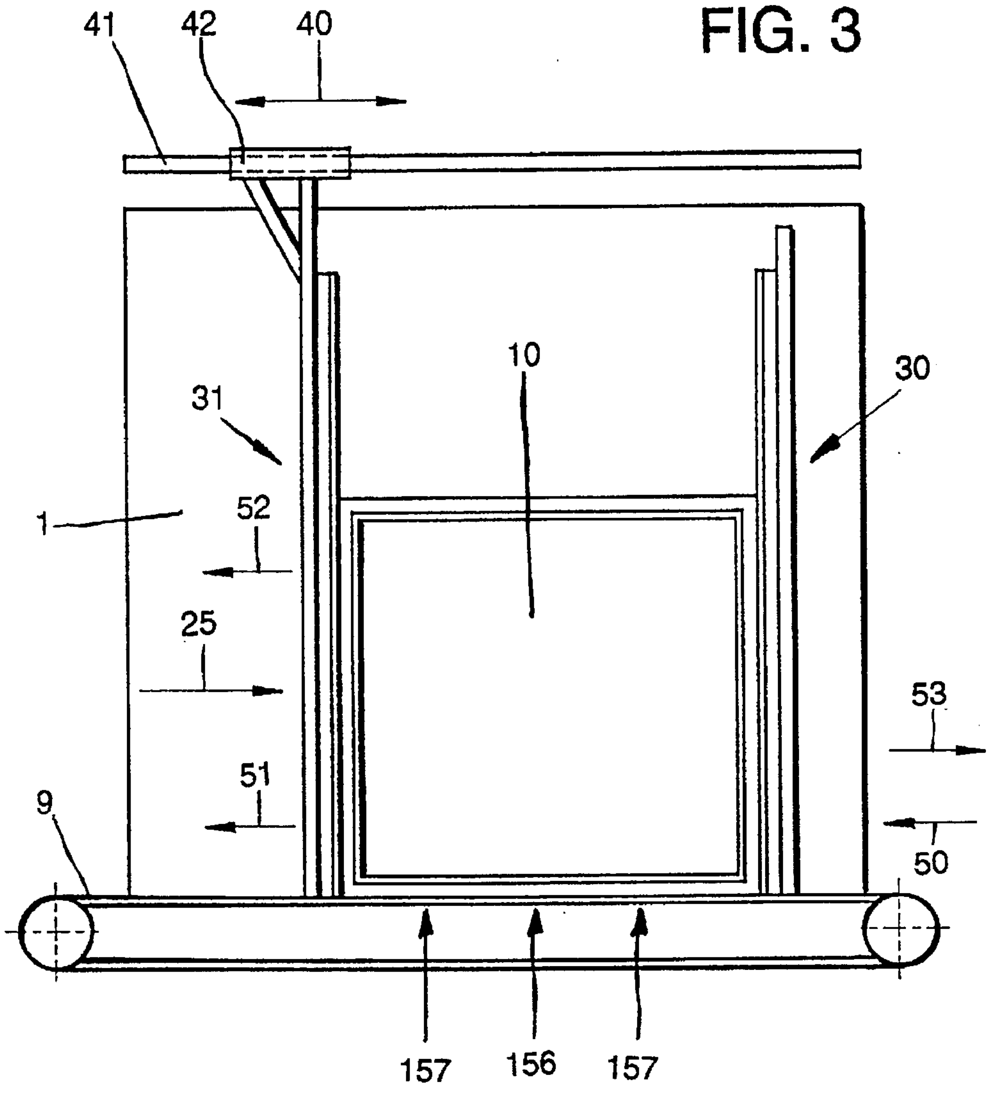
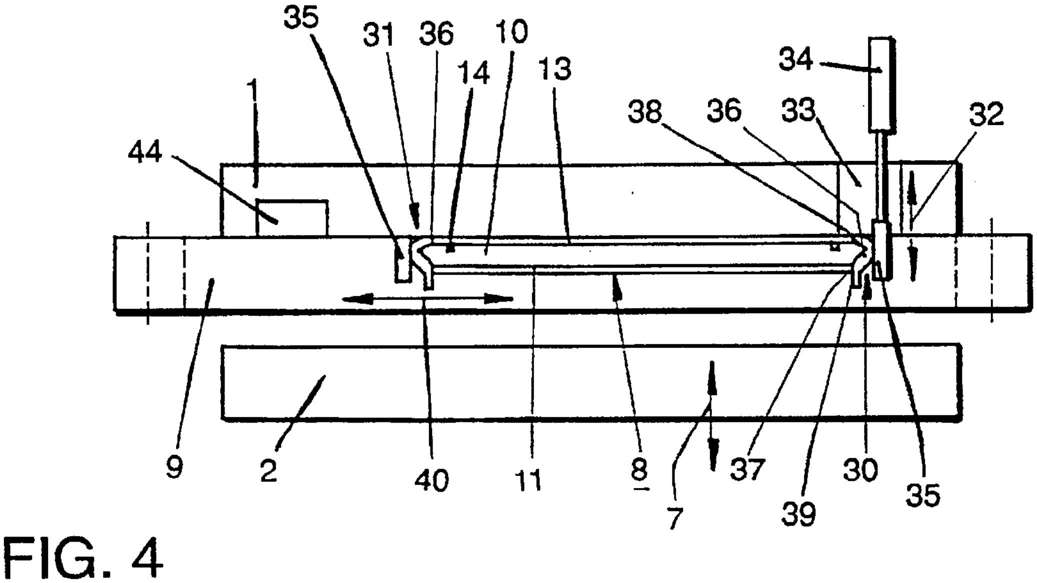
FIG. 4

FIG. 6
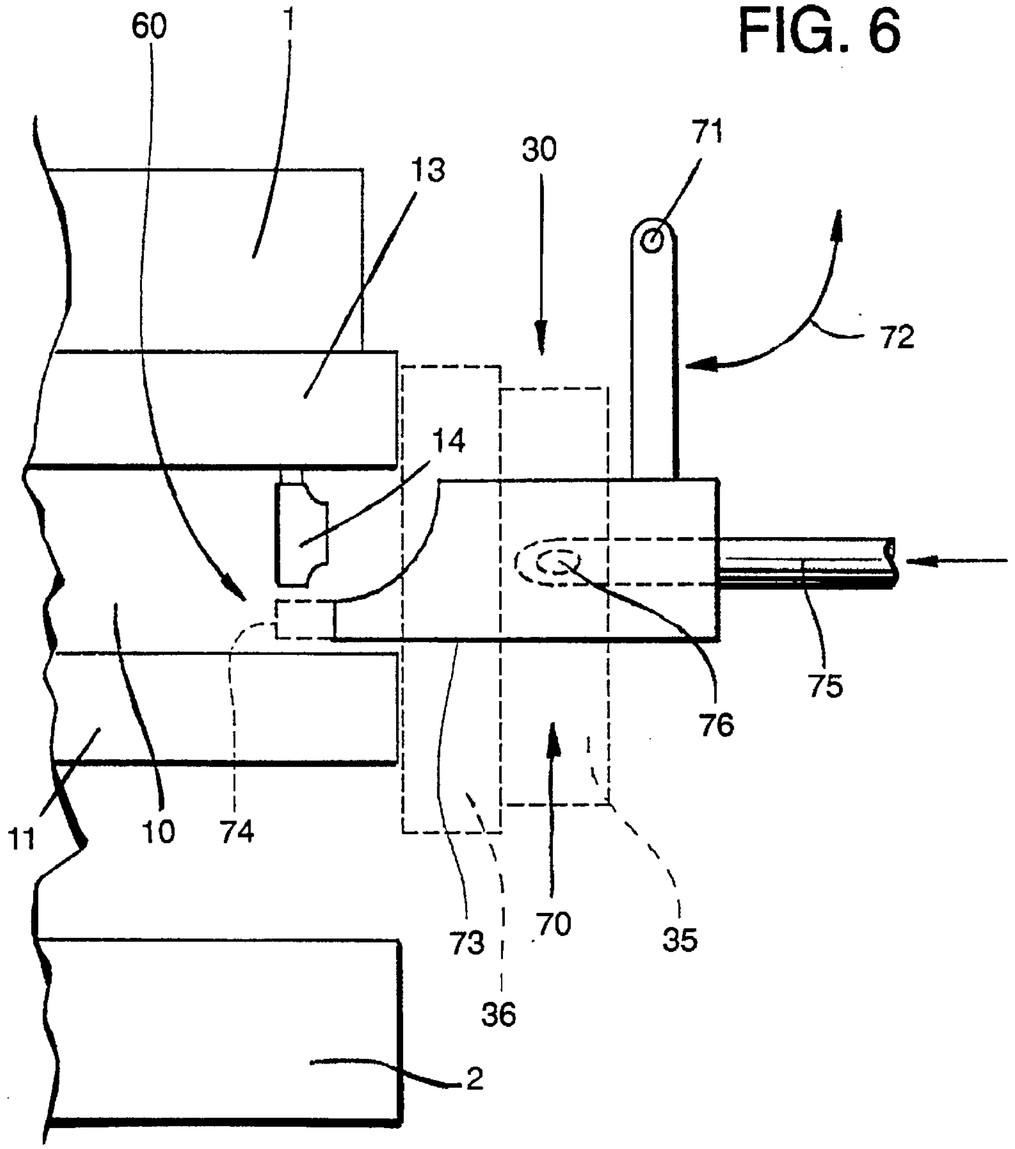
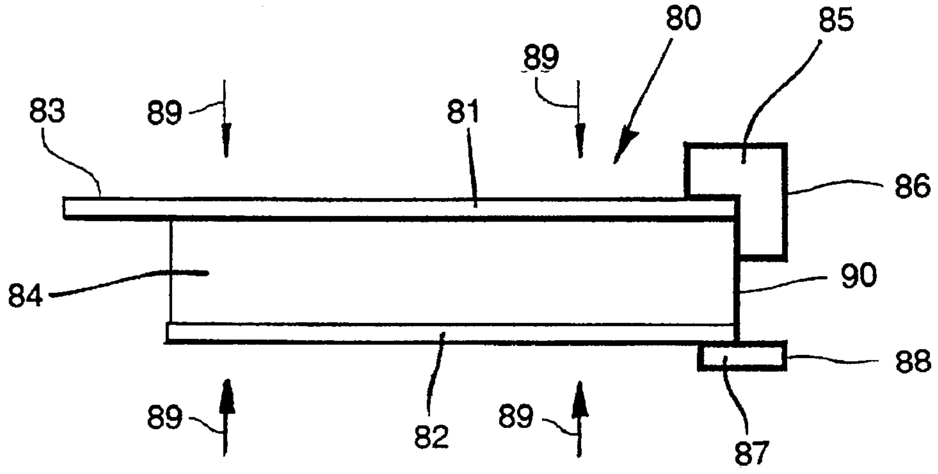
FIG. 7

DEVICE FOR FILLING INSULATING GLASS PANES WITH HEAVY GAS

FIELD OF THE INVENTION

The invention relates to a device for filling insulating glass panes with heavy gas, with plates which are aligned essentially vertically and which are located on either side of the insulating glass pane to be filled, of which at least one plate can move transversely to its plane relative to the other plate, with a conveyor means for insulating glass panes in the area of the lower edge of the plates, the conveyor means being made gas-tight, and with sealing means which in their active position are assigned to the two vertical edges of the insulating glass pane, for which one of the sealing means can move parallel to the planes of the plates.

BACKGROUND OF THE INVENTION

A device of the initially mentioned type has been disclosed by DE 93 02 744 U1.

The problem of the invention is, based on the known device, to propose a device which is improved with respect to the capacity of one sealing means to move.

SUMMARY OF THE INVENTION

This problem is solved according to the invention by mounting the sealing means which can move in the conveying direction with its ends on carriages which can move parallel to the upper and lower horizontal edge of one plate.

If according to one proposal of the invention the carriages are attached to endless conveyor belts and can move on guide rails, adjustability is not a problem and the movable sealing means can be quickly and promptly brought into its active position.

In one embodiment of the invention it is provided that the sealing means on its lower end is attached to swivel with the carriage which can move along the lower horizontal edge of the plate around an axis which is aligned parallel to the conveying direction, and that the sealing means can move back and forth on its upper end onto the opposite plate. In this embodiment the movable sealing means can be moved away from the plate on which it is guided so that no disruptive friction which causes wear occurs between the plate and the sealing means when the sealing means is moved.

When the sealing means is made essentially cuboidal, and when the sealing means between two carrying plates has a body which can be elastically compressed and the sealing means can be placed with one of its narrow sides against the facing edges of the panes of the insulating glass pane, the plates can be brought close to one another, for example for pressing the filled insulating glass panes, without this being prevented by the movable sealing means which is located between the plates at least in its active position. In this case it is preferred when there are sealing strips, especially those of rubber elastic material, on the narrow side of the sealing means which faces the insulating glass pane. In this embodiment it can still be provided that one of the sealing strips is made L-shaped in cross section and with one of its arms extends as far as the narrow side of the body of elastically flexible material facing the insulating glass pane. It is furthermore preferred that the sealing strips project above the narrow side of the sealing means facing the insulating glass pane. In this way a sufficiently effective sealing means is easily formed.

Accurate guidance of the movable sealing means occurs when one of the two carrying plates has one edge which projects above the body of elastically flexible material.

According to the invention it is preferred that the body of elastically flexible material is a body of plastic foam.

A similarly favorable arrangement arises when the sealing means is attached to the carriages via the carrying plate facing the plate along which it can be moved. With a similar advantage it can be provided that the swivelling axis on the lower end of the sealing means is aligned relative to the adjacent plate such that the sealing strip facing the plate is directly adjacent to the surface of the plate facing the other plate.

If the sealing means, provided on the side which is on the downstream side relative to the conveying direction of the conveyor means, can be drawn back and forth transversely to the plane of the stationary plate, according to the invention it is preferred that the sealing means can be placed against the vertical, downstream-side edges of the two plates.

One favorable motion arises when the sealing means can be placed against the edges of the plates by a swivelling motion. This advantageous motion can be achieved according to one embodiment of the invention by the fact that the sealing means is attached to an arm which is adjustably supported in the machine frame via parallelogram connecting rods. In practice it has proven effective when on the lower and on the upper end of the sealing means there is one arm each which is supported in the machine frame via parallelogram connecting rods. The drive for executing the movements of the downstream-side sealing means is preferably designed such that the parallelogram connecting rods are coupled to a shaft to which a drive for twisting the shaft is assigned.

BRIEF DESCRIPTION OF THE PREFERRED EMBODIMENTS

Other features, details and advantages of the invention follow from the following description and the embodiments of the invention schematically described in the drawings.

FIG. 1 shows a first embodiment of the device in a side view,

FIG. 2 likewise shows in a side view a second embodiment of the device,

FIG. 3 shows a device in the view from the front without the front plate,

FIG. 4 shows a horizontal section through the device of FIG. 3 in the area of the insulating glass pane standing in it,

FIG. 6 shows in a top view an example for a means for supplying heavy gas,

Figure 1:
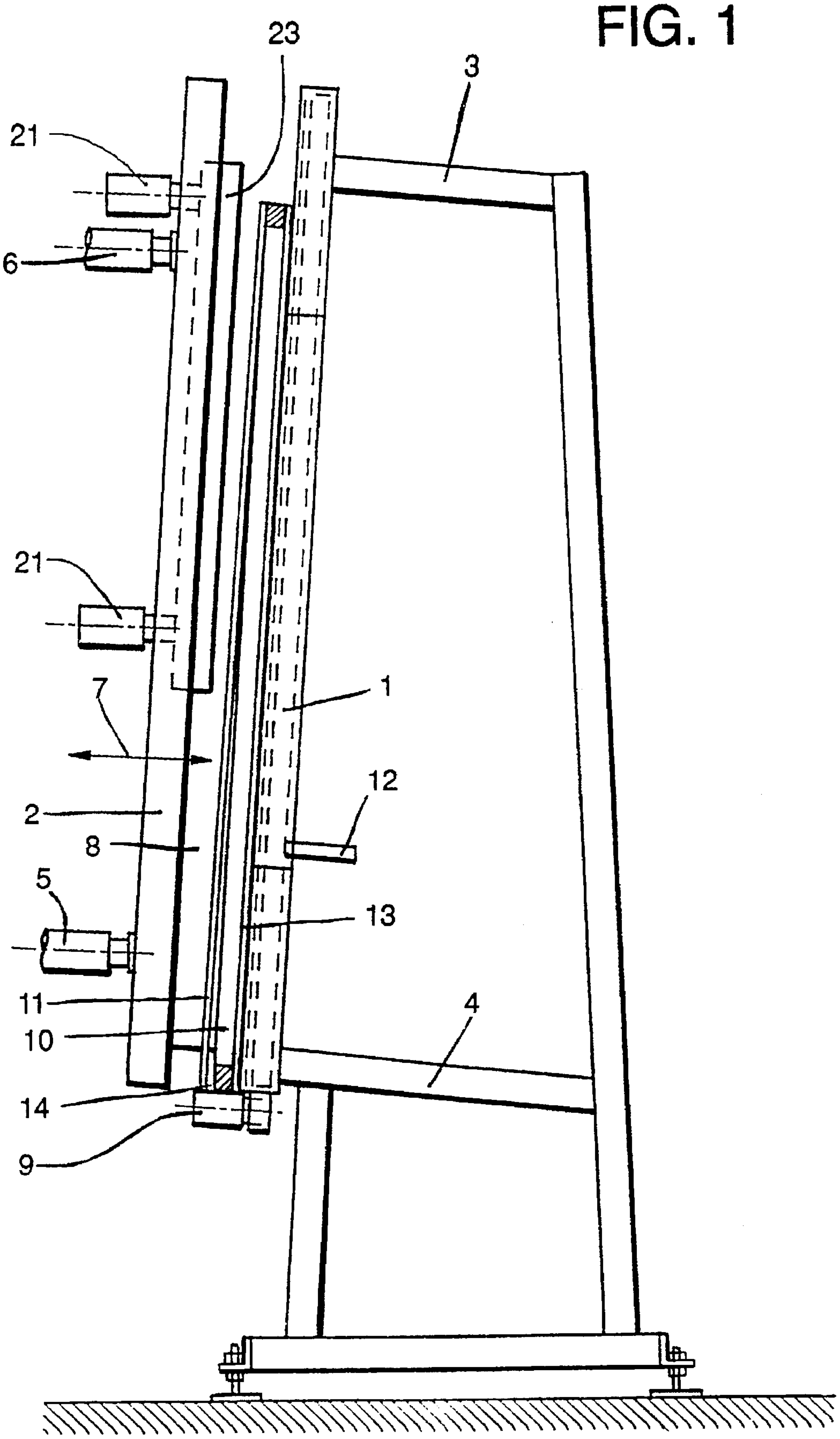
Figure 8:
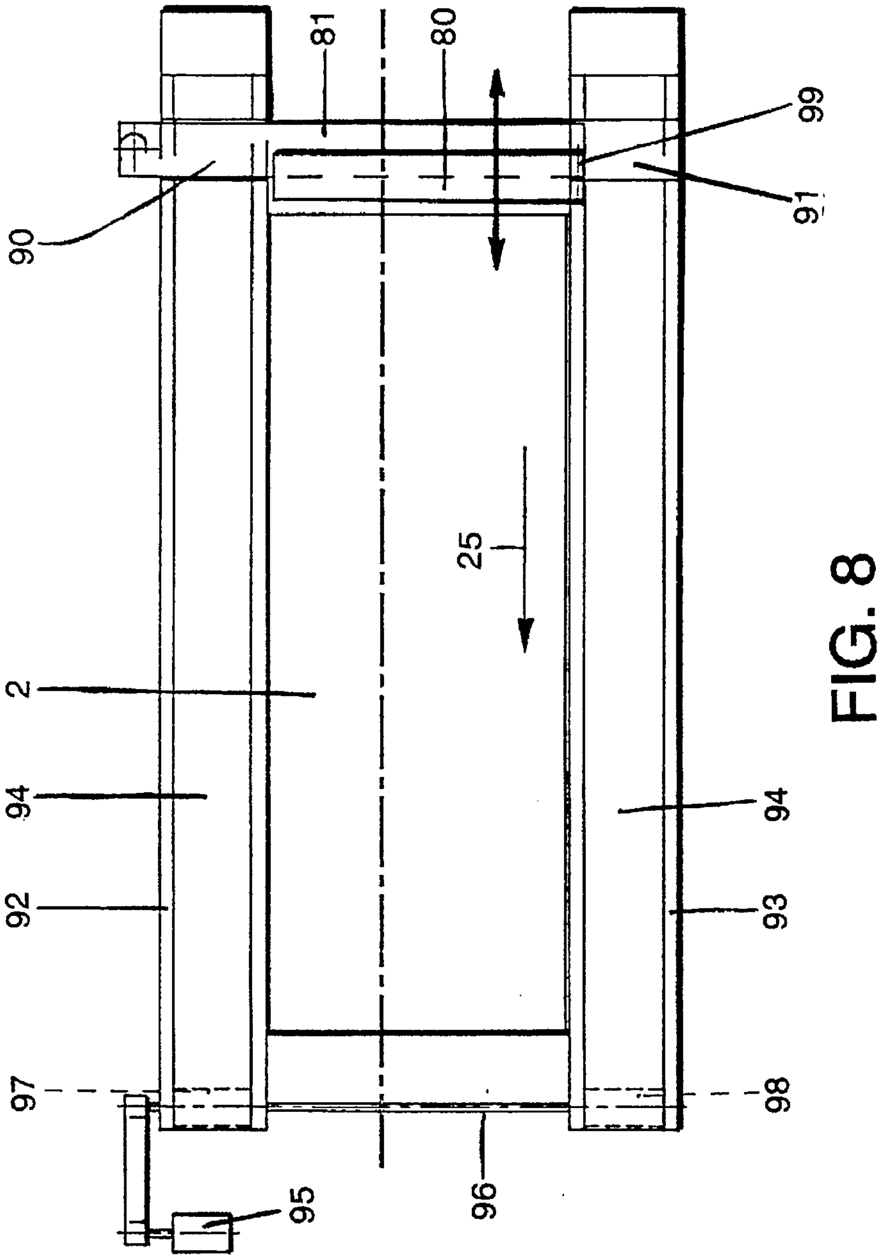
Figure 9:
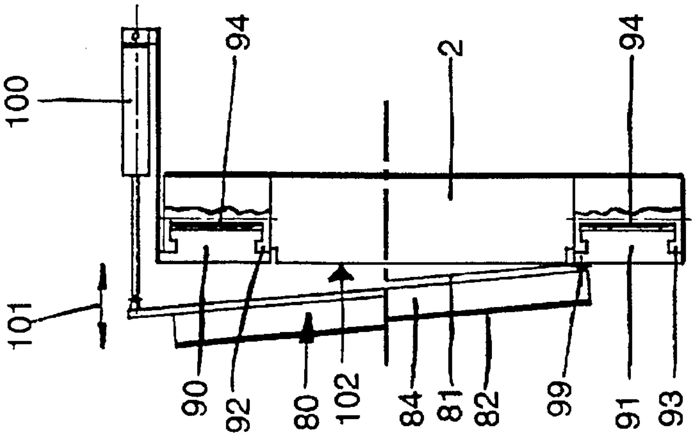
Figure 10:
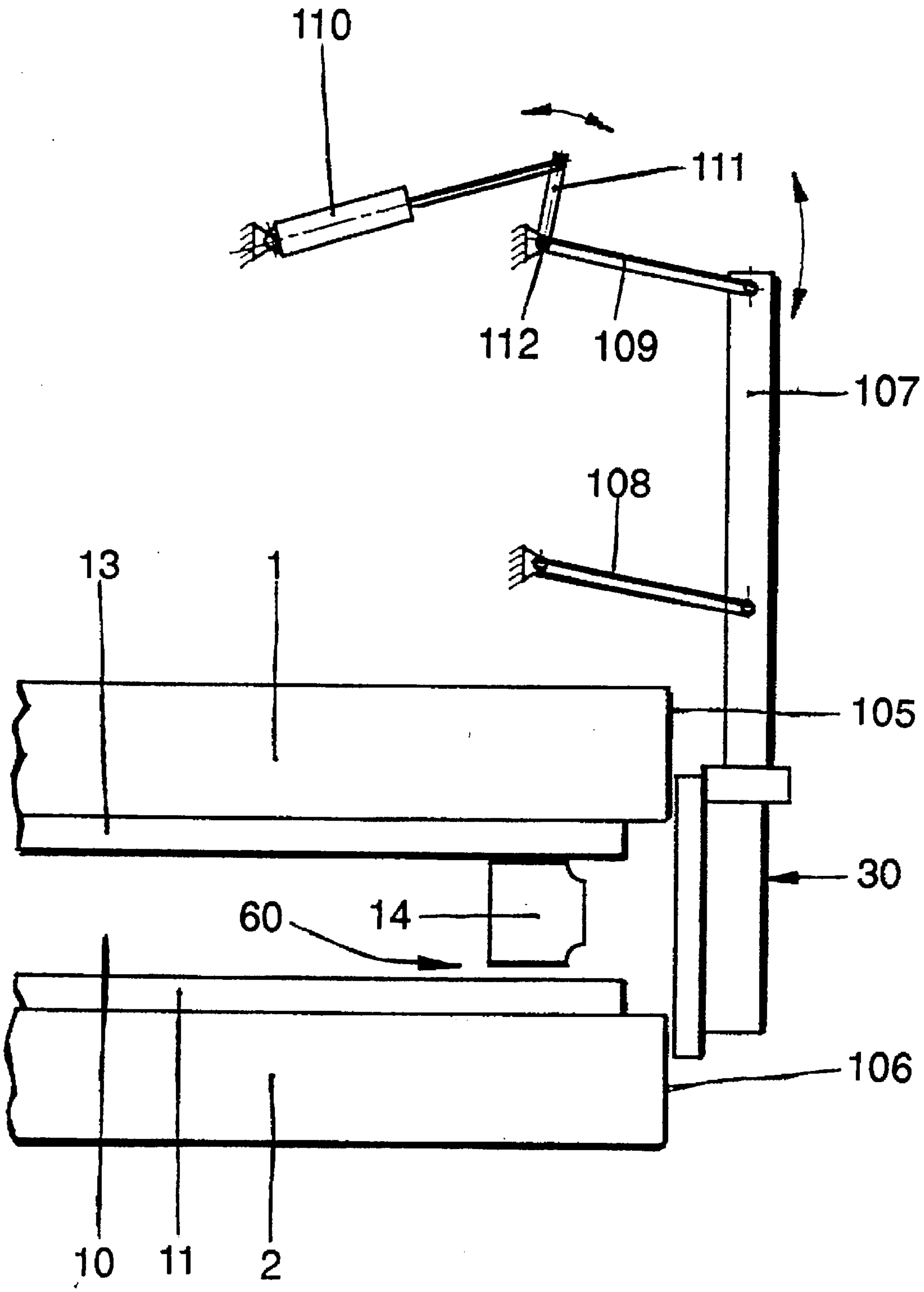
Figure 11:
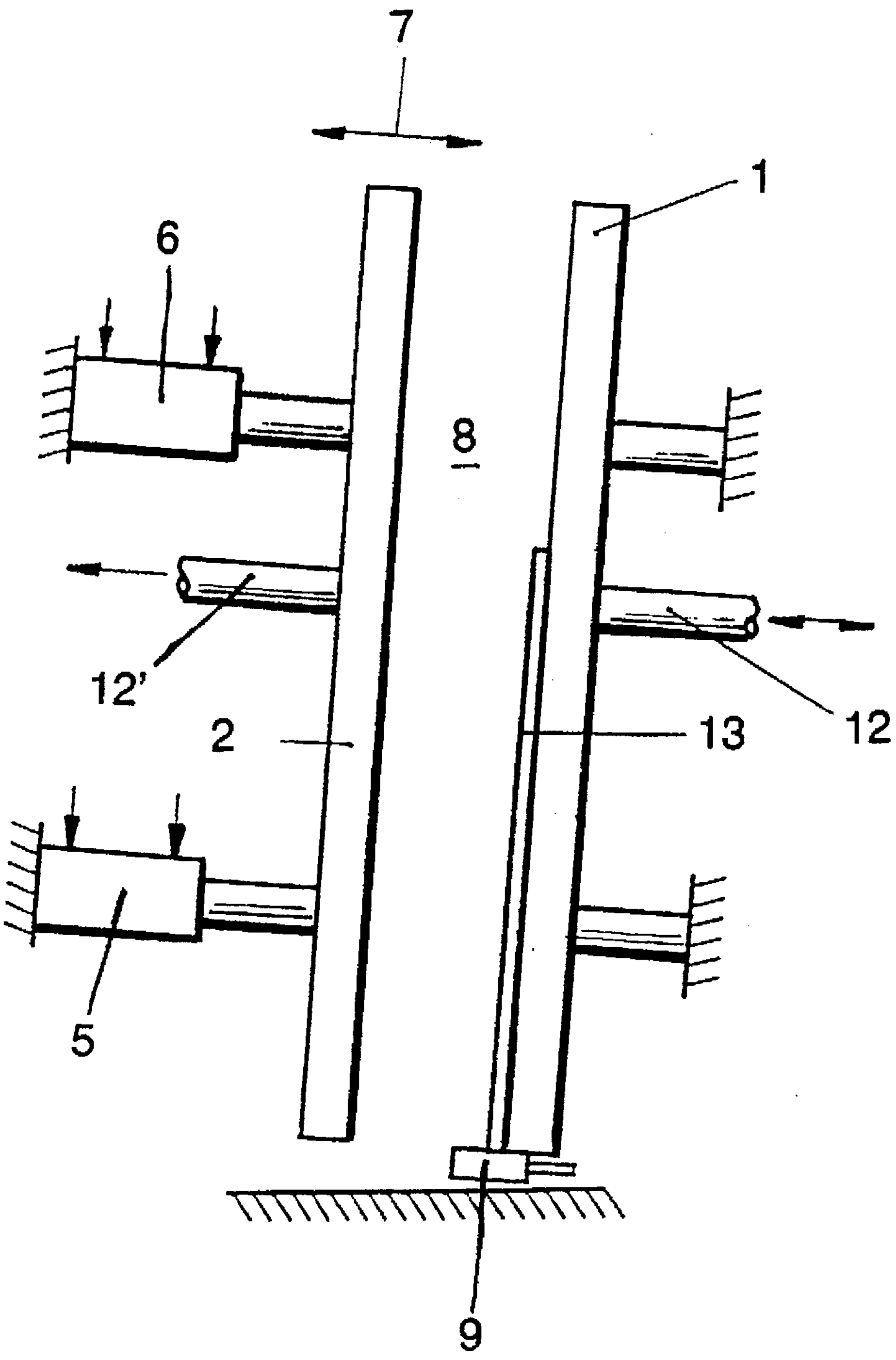
Figure 12:
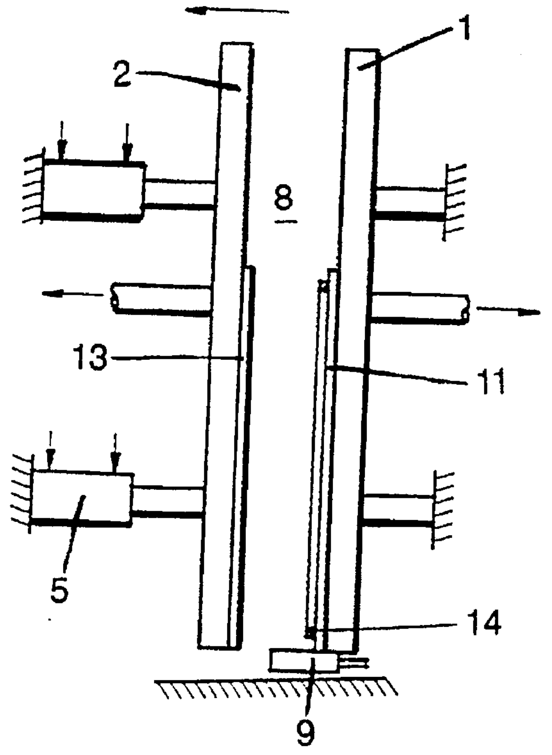
Figure 13:
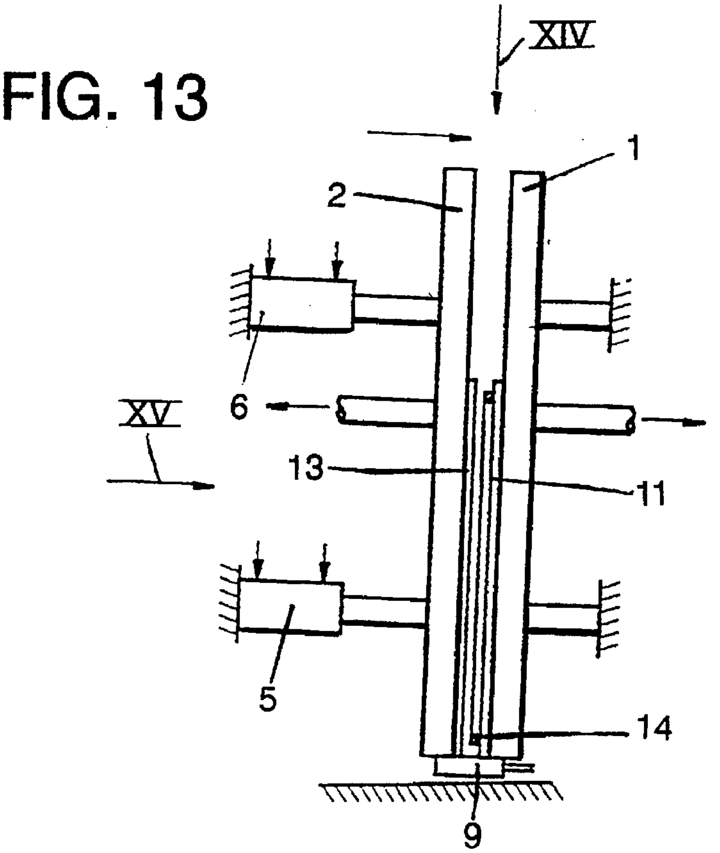
Figure 14:
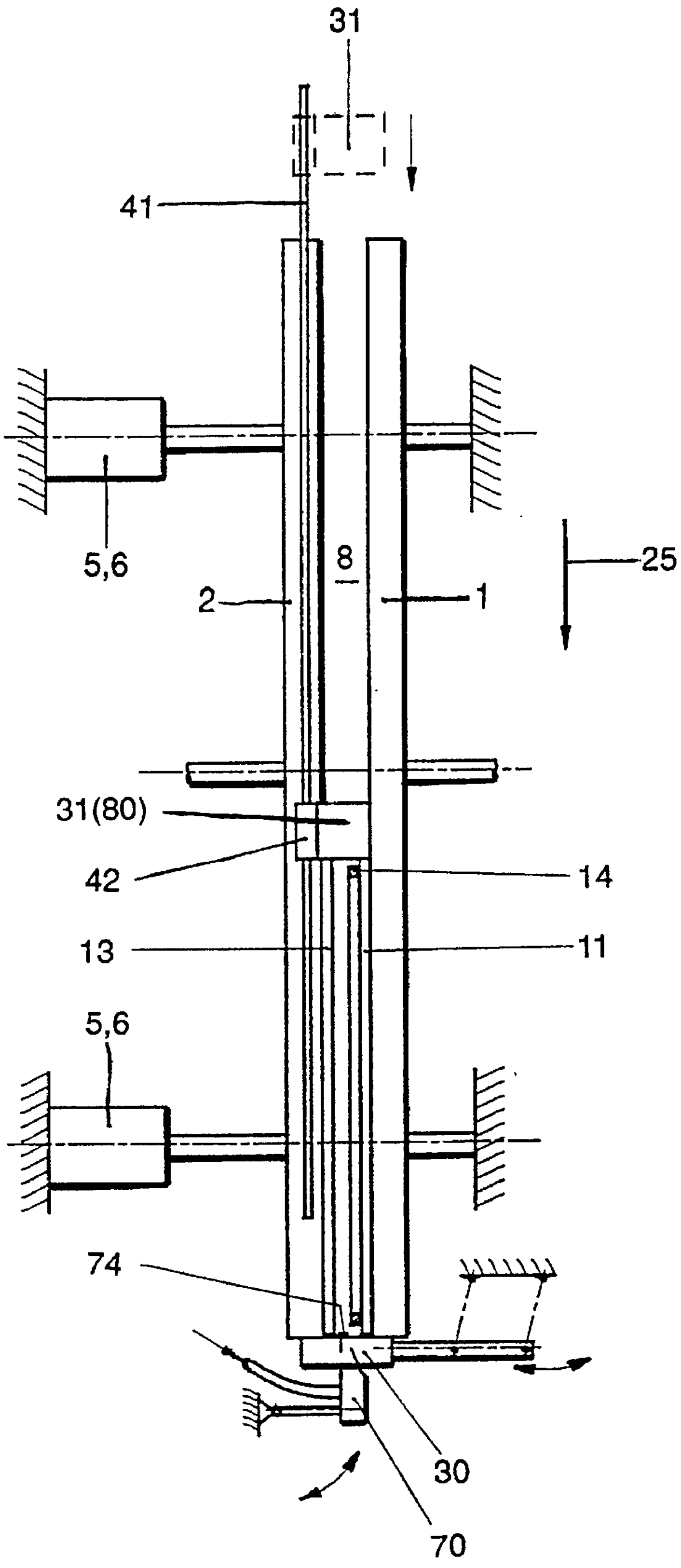
Figure 15:
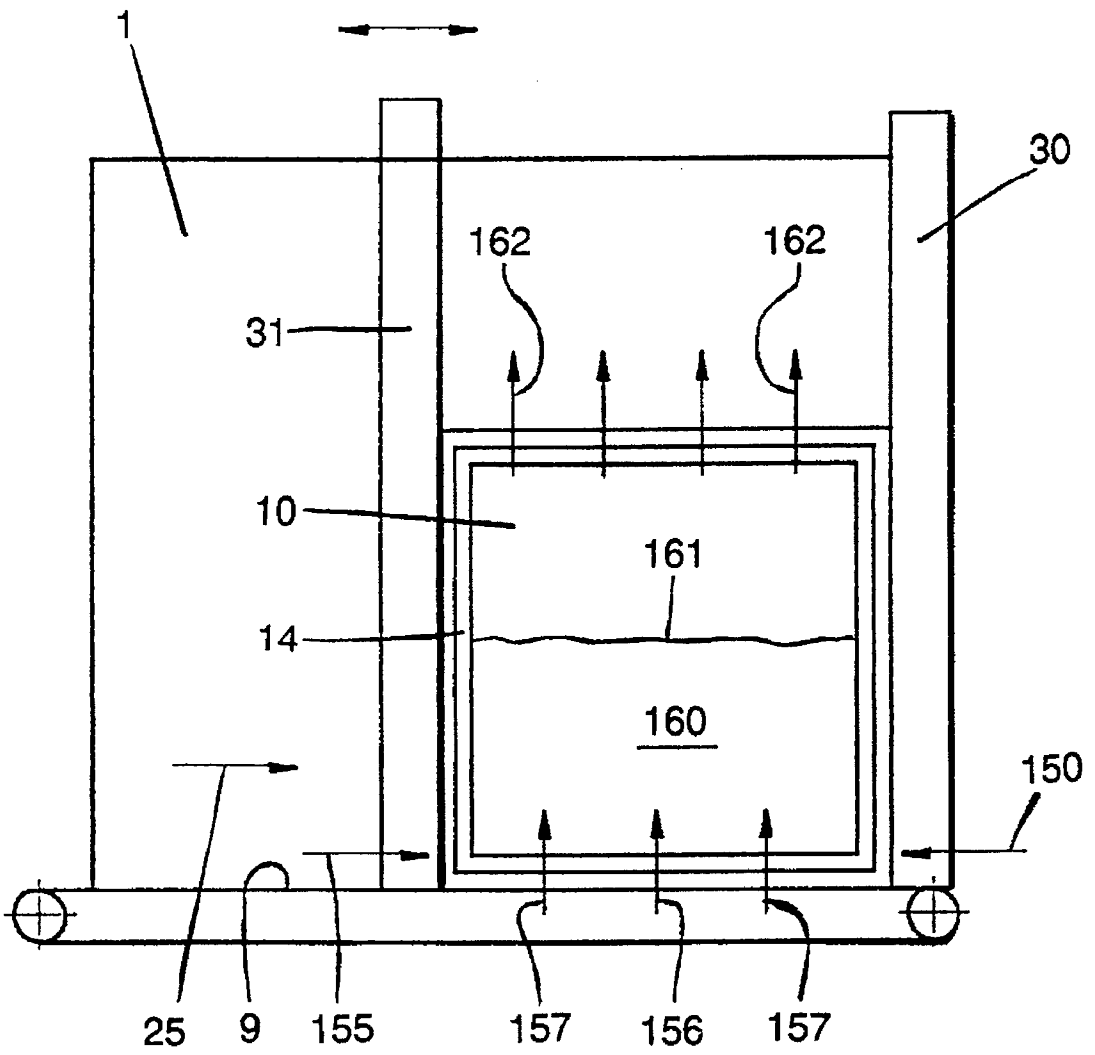
Figure 16:
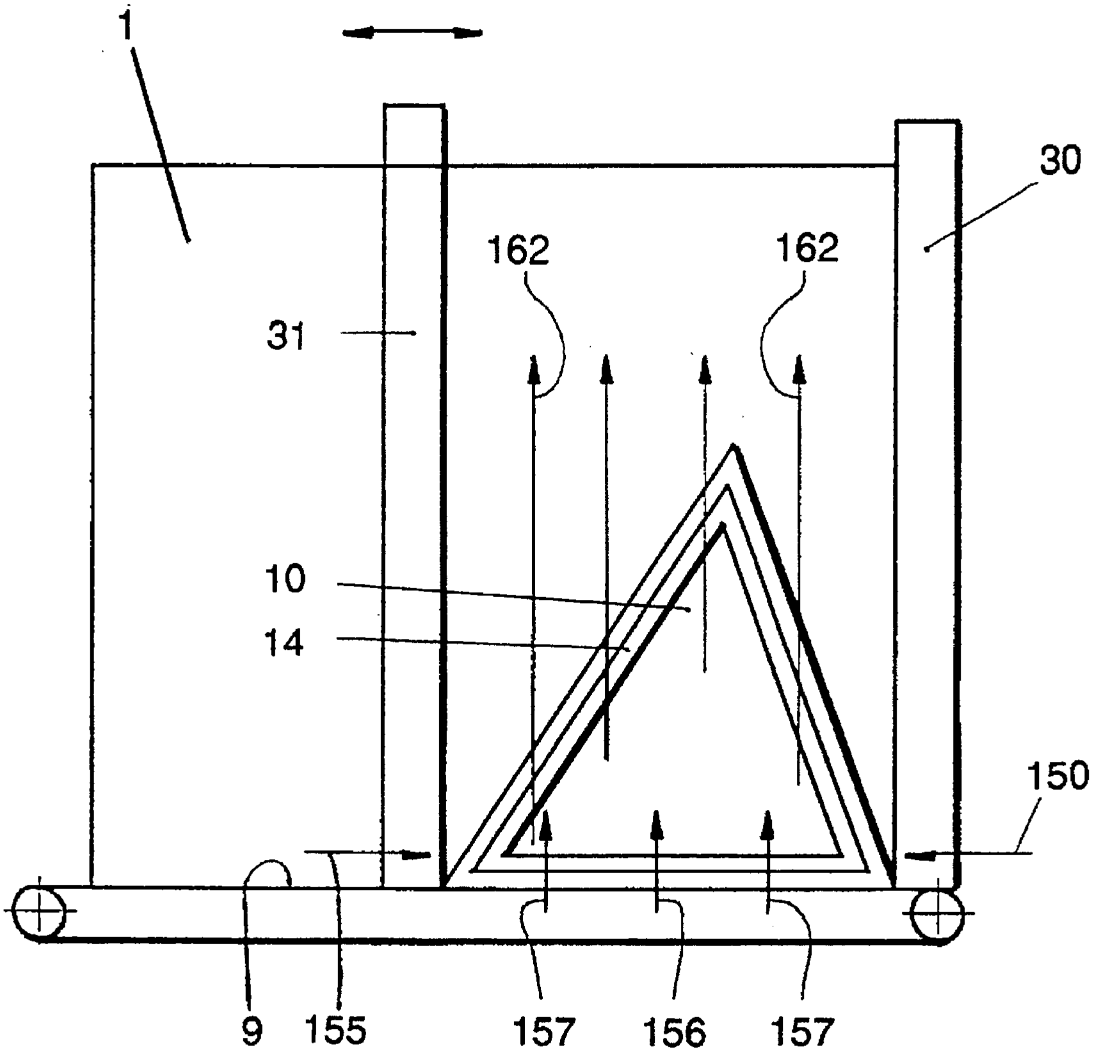
Figure 17:
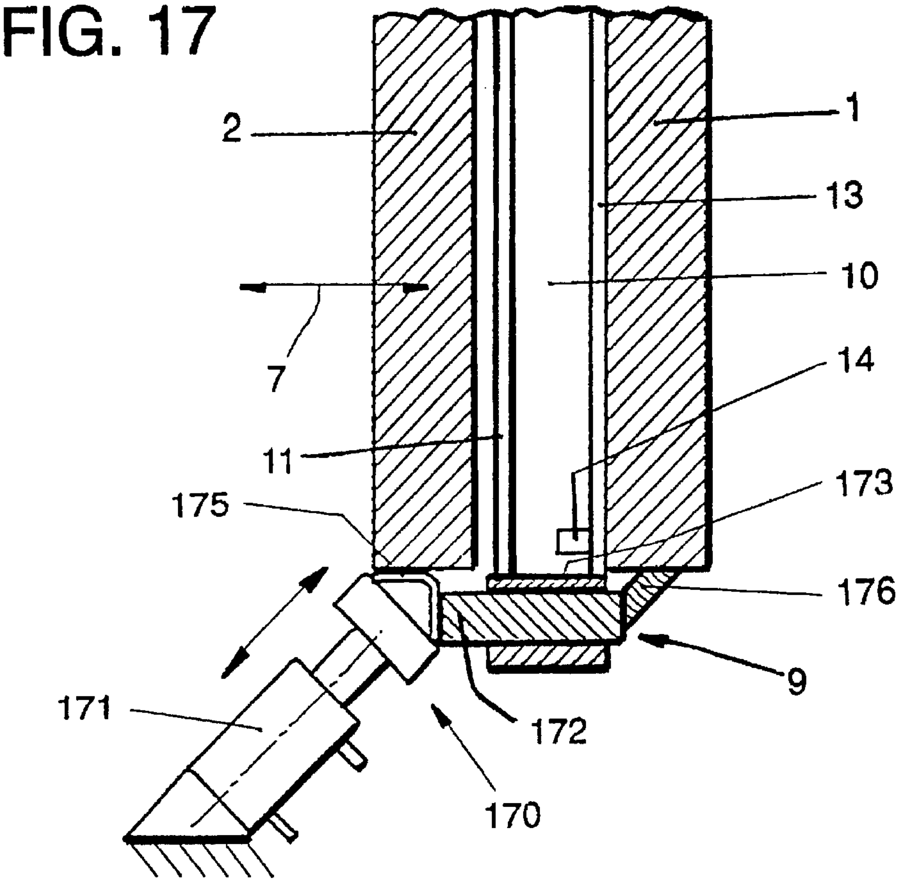
Figure 18:
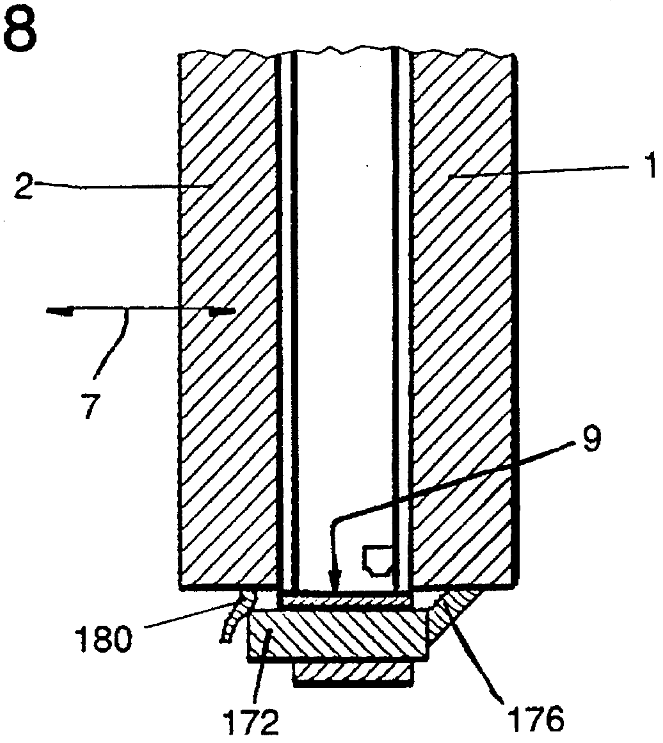
Figure 19:
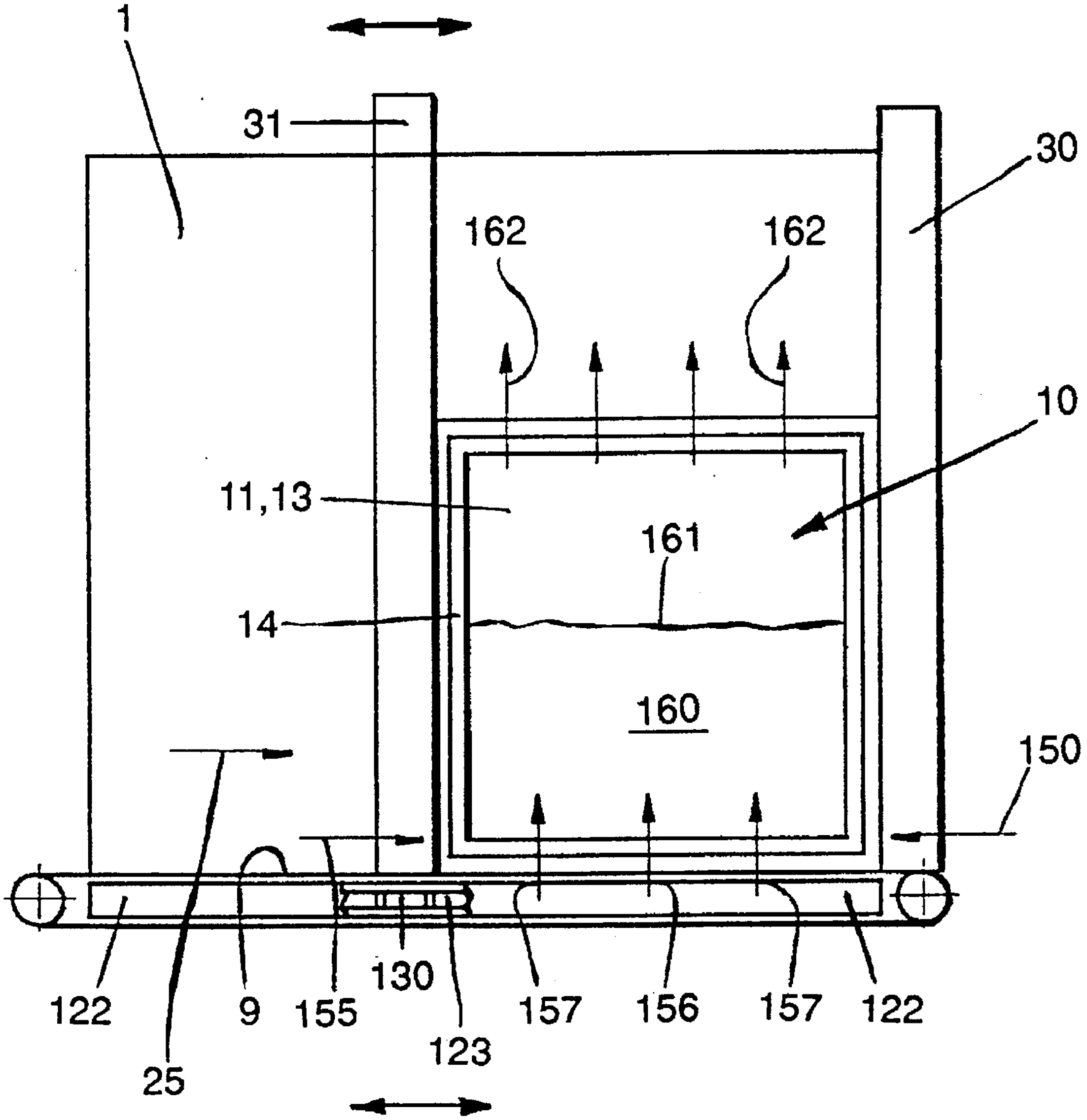
Figure 20:
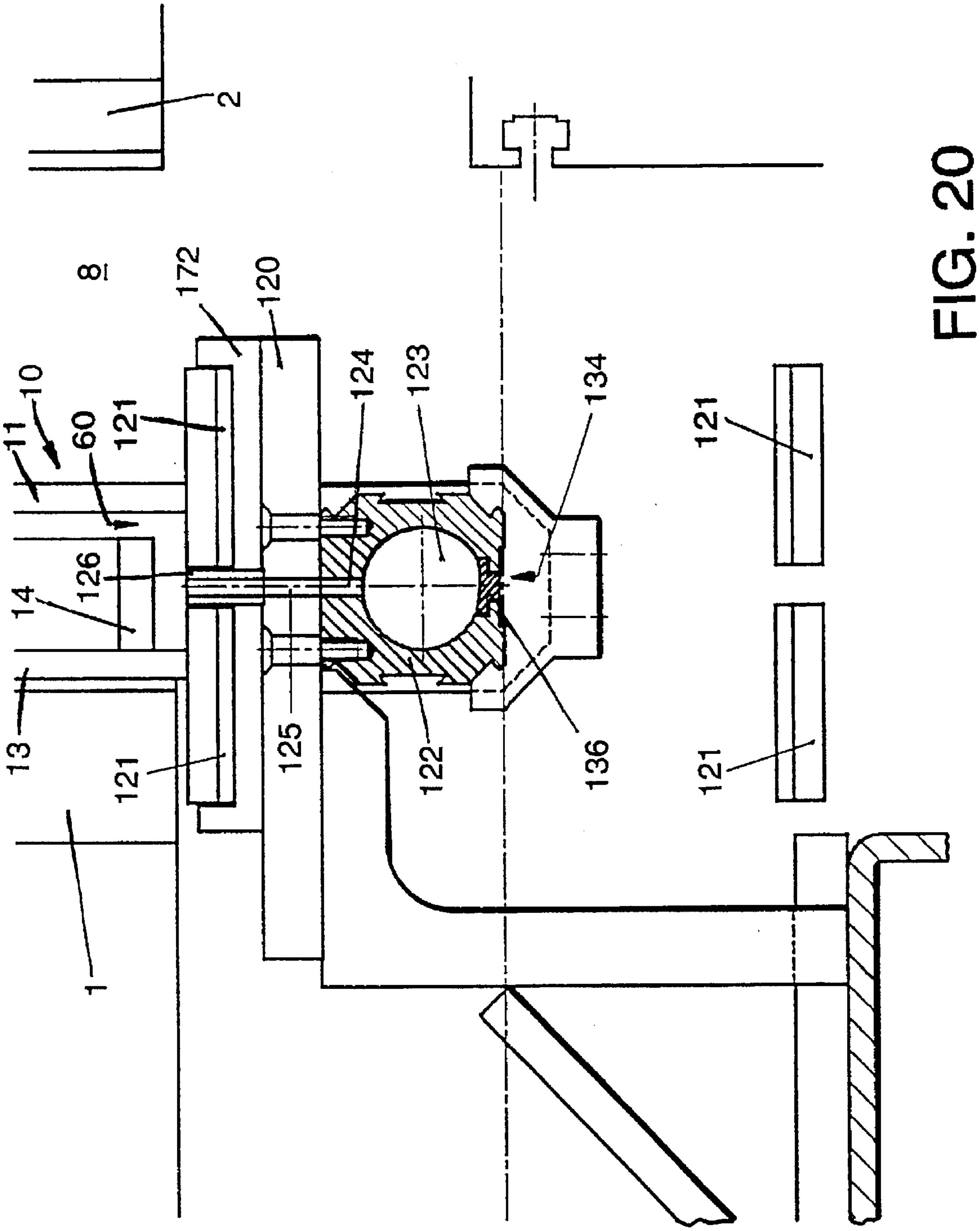
Figure 22:
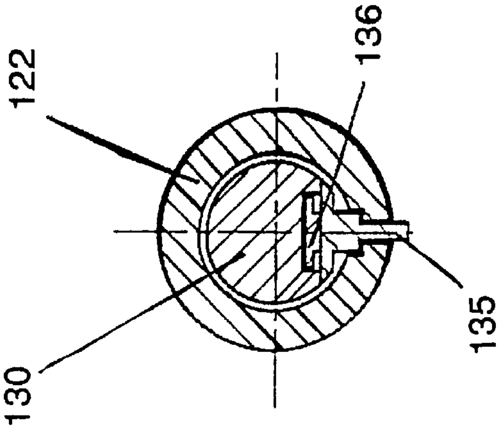
Figure 21:
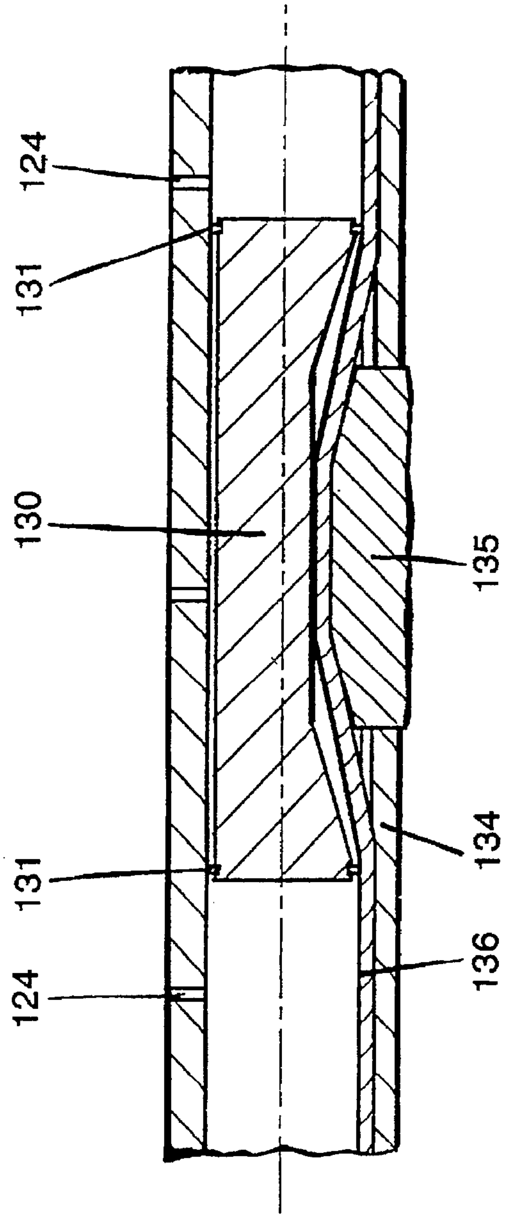

FIG. 7 in a front view shows an example for a sealing means,

FIG. 8 shows one embodiment of a movable sealing means according to the invention,

FIG. 9 shows a side view to FIG. 8,

FIG. 10 shows one embodiment of the sealing means located on the downstream side according to the invention,

FIG. 11 shows an assembly device formed simultaneously as a press in a first working stage,

FIG. 12 shows the device from FIG. 1 in a second working stage,

FIG. 13 shows the device in its position when the insulating glass pane is filled with heavy gas,

FIG. 14 shows the device in the position according to FIG. 13 (from above) viewed in the direction of arrow XIV from FIG. 13, FIG. 15 shows the device in the position according to FIG. 13 viewed in the direction of arrow V without the movable press plate, FIG. 16 shows the device when the molded panes are being filled, FIG. 17 shows a first embodiment of a seal on the lower edge of the movable plate and FIG. 18 shows a second embodiment of a seal, FIG. 19 shows one embodiment of the device in the position of FIG. 13 viewed in the direction of arrow XV without the movable press plate, FIG. 20 shows one detail of the device for assembly and filling of insulating glass plates in the area of the lower edge of the two plates and FIGS. 21 and 22 schematically show one embodiment of the piston which can move in the channel, with its actuating finger.

The device shown in FIGS. 1 through 7 has essentially vertical plates 1 and 2, parallel to one another, tilted to the rear, preferably slightly against vertical, for example by 3+ to 5°.

Plates 1 and 2 can be the plates of a device for pressing of insulating glass panes 10. In the embodiment shown plate 1 is attached to carriers 3 and 4 of the frame of the device. Plate 2 can be moved in the direction of double arrow 7 via hydraulic cylinders 5 and 6. On the lower edge of stationary plate 1, under space 8 located between plates 1 and 2, there is conveyor belt 9, standing on which and leaning against plate 1 affixed to the frame and formed for example as an air cushion wall, insulating glass pane 10 (package consisting of two glass panes and a spacer frame inserted between them) can be conveyed into space 8.

Although not shown in FIGS. 1 through 16 and 19 through 22, on adjustable plates 2 of these devices along the lower horizontal edge there are seals which seal plate 2 underneath relative to conveying means 9. Embodiments thereof are shown in FIG. 17 and 18 and are described later.

It is apparent from FIG. 1 that glass pane 11 of insulating glass pane 10 facing movable plate 2 adjoins spacer frame 14 attached to other glass pane 13 only in the upper area, against which the lower horizontal edge of this glass pane 11 of insulating glass pane 10 has a distance from spacer frame 14 so that there and partially on the vertical edges of the insulating glass pane there is an access to the interior of insulating glass pane 10.

To load stationary plate 1 formed as an air cushion wall, the plate is equipped with connection 12 for delivery of compressed air.

Figure 2:
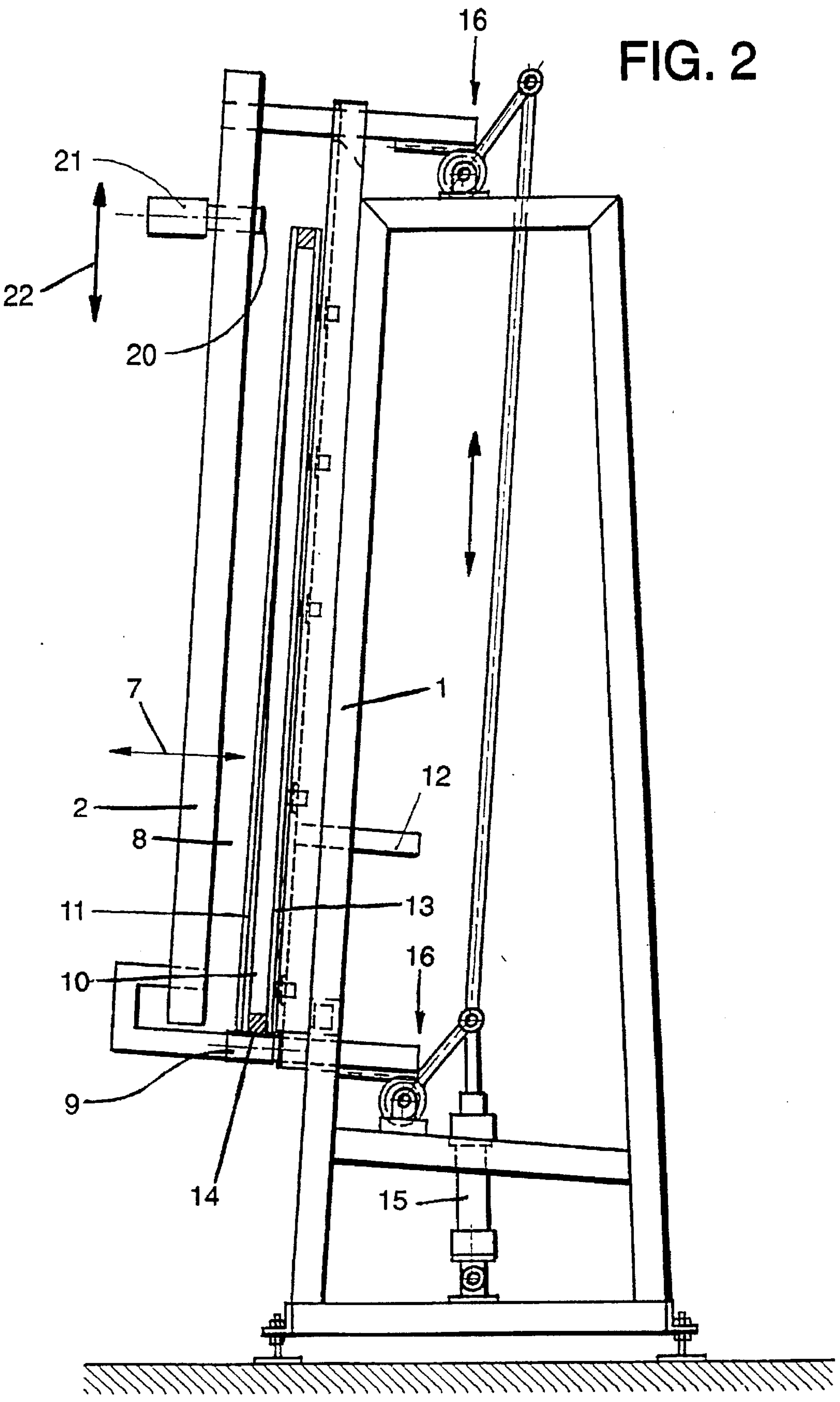

The embodiment of the device shown in FIG. 2 differs from the device shown in FIG. 1 among others in that movable plate 2 can be adjusted using rack-and-pinion drives 16 in the direction of double arrow 7. In this case, in each of the four corners of movable plate 2 there is a rack. Rack-and-pinion drives 16 are activated by common hydraulic motor 15 via a rod.

A more detailed explanation of this drive which can be used for example for adjusting plate 2 can be found in AT 385 499 B. Movable plate 2 can also be adjustable using spindle drives as is known from AT-A 2956/87 (disclosed Jun. 15, 1990).

It is shown in FIG. 2 that on movable plate 2 are plungers 20 which using hydraulic cylinders 21 can be advanced onto the upper edge of insulating glass plate 10 and glass pane 11 of insulating glass pane 10, glass pane 11 adjacent to movable plate 2, is kept against spacer frame 14. Instead of individual plungers 20 there can also be a horizontally continuous pressure strip.

To be able to align plungers 20 or the horizontally continuous pressure strip relative to the upper edge of insulating glass pane 10, the arrangement of plungers 20 or the pressure strip and hydraulic motors 21 can move on movable plate 2 in the direction of double arrow 22, i.e., essentially vertically. If the intention is to abandon vertical adjustability of the pressure elements, resilient pressure strips 23 or those which are aligned vertically and which can be adjusted with hydraulic cylinders 21 can be provided (FIG. 1).

Plungers 20 or pressure strips 23 can be drawn back, especially when the device is also used to press insulating glass pane 11 after filling with heavy gas is completed, into or behind the surface of movable plate 2 which faces stationary plate 1.

Instead of hydraulic motors 21 for moving plungers 20 or pressure strip(s) 23, these parts (plunger or pressure strip) can also be resiliently supported on movable plate 2 so that they can be pushed back, when insulating glass pane 10 is pressed, into a position in which their front side is flush with the surface of movable plate 2 facing insulating glass plate 10.

The interior of insulating glass plate 10 located in the device according to FIG. 1 or FIG. 2 is sealed to the top by the upper arm of spacer frame 14 and to the bottom, specifically where insulating glass pane 10 is still open, by continuous conveyor belt 9 (or another correspondingly gas-tight conveying means).

To seal the interior of insulating glass pane 10 also on the roughly vertical lateral edges, there are sealing means 30 and 31 which can be placed against the vertical edges of insulating glass pane 10 or plates 1 and 2.

Figure 5:
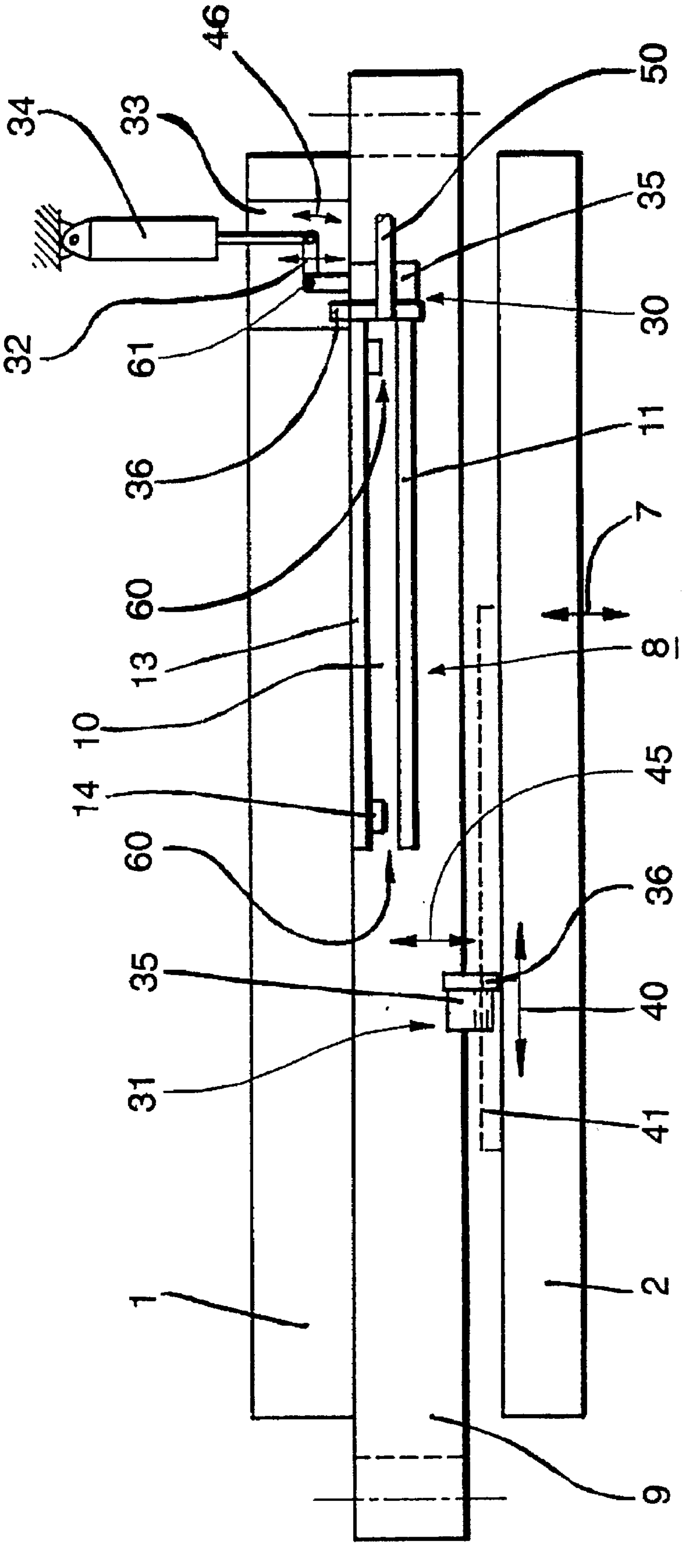
FIG. 5 shows in a cross section analogously to FIG. 4 another embodiment.

Sealing means 30 which is forward relative to the conveying direction (arrow 25 in FIG. 3) can be advanced perpendicularly to the plane of stationary plate 1 (double arrow 32) into space 8 between two plates 1 and 2 or can be swivelled in around essentially vertical axis 61 (see FIG. 5, arrow 46). To do this in stationary plate 1 is vertical slot 33 and sealing means 30 is coupled to a drive, for example, at least one hydraulic cylinder 34.

Sealing means 30 consists in the example shown in FIGS. 3 and 4 of an essentially vertical carrier strip 35 and seal 36 of elastic material. Seal 36 is made essentially V-shaped in cross section in one embodiment and has two sealing lips 37 and 38 which seal against the vertical edges of two glass panes 11 and 13 of insulating glass pane 10.

In order that sealing means 30 can be used for insulating glass panes 10 with different overall thickness, sealing lip 37 can carry catch 39 which is aligned essentially perpendicularly to stationary plate 1. Sealing means 30 can act at the same time as an end stop for insulating glass pane 10.

Second sealing means 31 can be adjusted in the device in the direction of double arrow 40. To do this sealing means 31, as shown in FIG. 3, can be guided via carriage 42 on guide rail 41 attached to the machine frame and can be moved by a drive which is not shown. The structure of sealing means 31 corresponds otherwise to that of sealing means 30, i.e., it has carrier strip 35 and seal 36 itself with two sealing lips 37 and 38 and catch 39.

Sealing means 30 and/or 31 can also be located on movable plate 2 in an altered embodiment.

An embodiment is also possible in which sealing means 30 is arranged as shown in FIG. 4, and sealing means 31 is located on movable plate 2 (FIG. 5). In this case guide rail 41 is attached to movable plate 2. To move sealing means 31 out of space 8 between plates 1 and 2 during transport of insulating glass panes 10 which are still open and which are to be filled with heavy gas into the device, in the embodiment according to FIG. 4 in plate 1 there can be recess 44 into which sealing means 31 can be moved in order to free space 8 between plates 1 and 2. In sealing means 31 guided on plate 2 it is also possible to provide corresponding recess 44 in plate 2 for accommodating sealing means 31 when the latter is in its readiness position. In many cases however it will be enough to move movable plate 2 and thus sealing means 31 away from plate 1 in order to create space for delivery of insulating glass pane 10.

On sealing means 30 is connection 50 for supply of heavy gas with which the interior of insulating glass pane 10 is to be filled. Furthermore, there can be at least one connection 51, 52 or 53 via which air or an air-gas mixture emerging from the interior of insulating glass pane 10 is diverted (in FIG. 3 the connection are symbolized only by arrows). In this case there are different possibilities of the combination of these connections 50 through 53, 157 and 156.

Thus connection 50 can be provided for the supply of heavy gas in the area of the from, lower comer of insulating glass pane 10 on sealing means 30. Connection 51, 52 or 53 for drawing off air or the air-gas mixture can be provided on sealing means 31 in the area of the lower comers of insulating glass pane (10) (arrow 51) which is the rear comer relative to the conveying direction, in the area of the lower, upper corner of insulating glass pane 10 (arrow 52) or in the area of the vertical edge of insulating glass pane 10 (arrow 53) which is the forward edge relative to the conveying direction (arrow 25). According to one embodiment still to be explained connections 51 through 53 can also be completely abandoned or in combination with a means for supply of heavy gas can be combined by conveyor belt 9 which is divided lengthwise or provided with the corresponding openings (compare arrows 156 and 157 in FIG. 3).

When connection 50 is combined with connection 51, connection 50 is preferably designed such that the heavy gas flows into the interior of insulating glass pane 10 with flow directed upward to prevent the heavy gas from directly reaching connection 51.

Another possibility consists in combining connection 50 with connection 52 so that there is diagonal flushing of insulating glass pane 10.

When connection 50 is combined with connection 53, there is reverse flushing of the interior of insulating glass pane 10, as is known in principle from EP-444 391-A or DE 42 02 612-A, in which in this case connection 53 can have an outlet which points upward in the interior of insulating glass pane 10.

The specific configuration of connections 50, 51, 52 and 53 for the supply of heavy gas into and diversion of air and the air-gas mixture from the interior of insulating glass pane 10 is not critical. For example, there can be probes or nozzles which project into the interior especially for heavy gas supply, or simply the heavy gas supply line and the discharge line for the air or air-gas mixture are routed at the pertinent sites through carrier strip 35 and seal 36 so that they discharge in the area between two sealing lips 37 and 38. Openings which permeate conveyor belt 9 are also possible.

One sample embodiment for connection 70 for supply of heavy gas into the interior of insulating glass pane 10 is shown in FIG. 6 in a top view. Connection 70 has housing 73 which can be swivelled around essentially vertical axis 71 (arrow 72) into the active position shown in FIG. 6 and from this into a position swung behind the surface of plate 1 (or 2) facing insulating glass pane 10. Housing 73 has exit opening 74 which is shaped like a longitudinal slot and which can reach as far as in front of or into gap 60 of insulating glass pane 10. From opening 74 heavy gas supplied via at least one line 75 with lateral outlet 76 enters the interior of insulating glass pane 10. In housing 73 there can also be several lines 75 over one another.

In FIG. 6 the broken line shows sealing means 30 as well. Connection 70 can be moved independently of sealing means 30.

Especially when the heavy gas is supplied (also) via connection 50 and air or the air-gas mixture is removed at site 51 and/or 53, seals 36 between their sealing lips 37 and 38 can have crosspieces which are aligned horizontally, i.e., perpendicularly to plates 1 and 2, and which divide the space ("channel") between two sealing lips 37 and 38 and the edges of the two glass panes of insulating glass pane 10 in the vertical direction into at least two sections in order to at least hinder outflow of heavy gas through the channel formed between the edges of the glass panes of insulating glass pane 10 and seals 36. In this case it is also possible that the crosspieces in the center have a projection which fits at least partially into the space between the two glass panes of insulating glass pane 10. These crosspieces between sealing lips 37 and 38 are provided especially for seal 36 of sealing means 30.

When the connection for heavy gas supply 70 is combined with connection 53 for drawing off air or the air-gas mixture, it is recommended that a similar crosspiece be provided between two connections 50 and 53 if nozzles or probes which project into the interior of insulating glass pane 10 are not used to supply heavy gas and to draw off air or the air-gas mixture.

In FIG. 7 one preferred embodiment of sealing means 30 and/or 31 is shown.

Sealing means 80 which is overall essentially cuboid consists of two rectangular carrying plates 81 an 82 of rigid material, for example, sheet metal.

Between carrying plates 81 and 82 is elastically flexible cuboidal body 84 which consists for example of a plastic foam which can be elastically compressed and it is connected to the surfaces of carrying plates 81 and 82 facing it. Body 84 can also be replaced by springs, for which between carrying plates 81 and 82, especially in the area between sealing strips 85 and 87, there can be a flexible film.

One carrying plate 81 projects on one side with its edge 83 above foam body 84 and thus can be attached to a retaining device in order that sealing means 80 can execute the movements provided for sealing means 30 and/or 31.

On the side of sealing means 80 facing insulating glass pane 10 to be filled with heavy gas are sealing strips 85, 87, which consist of a rubber-like material, for example, polyurethane (commercial name Vulkollan) or the like. Sealing strip 85 is placed with its surface 86 against the adjacent vertical edge of one glass pane of insulating glass pane 10, conversely sealing strip 87 adjoins with its surface 88 the vertical edge of the other glass pane of insulating glass pane 10. Sealing strips 85 and 87 project above surface 80' of sealing means 80 such that on the edge of insulating glass pane 10 sealed with it an essentially vertical channel is formed.

If plates 1 and 2 of the device for filling insulating glass panes 10 with heavy gas are brought close to one another they are placed first of all against the outsides of two carrying plates 81 and 82 of sealing means 80. They are brought close to one another as body 84 is elastically compressed in the direction of arrows 89 dram in FIG. 7 so that sealing means 80 does not hinder the continued movement of plates 1 and 2 of the device on top of one another, for example when insulating glass pane 10 is closed and pressed.

In the embodiment shown in FIG. 5, sealing means 30 and 31 are equipped with flat seals 36 (these seals can also be used in other embodiments). Sealing means 30 which is assigned to the front vertical edge of insulating glass pane 10 and which is located on the downstream side can be swivelled into space 8 between plates 1 and 2 (axis 61, arrow 46) and in addition can be adjusted perpendicularly to these plates 1 and 2 (arrow 32), when connection 50/70 for supply of heavy gas is located directly on sealing means 30/80 in order to orient it relative to gap 60 between one glass pane 11 and spacer frame 14 of insulating glass pane 10.

Connection 50/70 can (in all embodiments) be positioned independently of sealing means 30. Thus, for example, the slotted outlet of connection 70 (FIG. 6) can be oriented relative to gap 60 between spacer frame 14 and glass pane 11 located at a distance from the latter without the need to adjust entire sealing means 30.

Since adjustable sealing means 31 is arranged on movable plate 2 in the embodiment shown in FIG. 5, insulating glass pane 10 to be filled with heavy gas can be conveyed unhindered into space 8 with plate 2 which is moved away from stationary plate 1, and sealing means 31. Sealing means 31 can be oriented relative to the vertical edge of insulating glass pane 10 by advancing plate 2 (arrow 7) and additionally by movement perpendicularly (arrow 45) to this plate 2 and can be sealed against it.

Two sealing lips 37, 38 of seals 36 of two sealing means 30 and 31 are so elastic, in the same manner as the optionally provided crosspieces and catch 39 provided if necessary on sealing lip 37, that they can be elastically compressed when insulating glass pane 10 filled with heavy gas is pressed by movable plate 2 approaching plate 1 without hindering the pressing process.

The device described using FIGS. 1 through 7 operates as follows:

A device or manually assembled insulating glass pane 10 known for example from AT-370 201-B or AT-370 706-B, with glass pane 11 which has a distance underneath from spacer frame 14 seated on other glass pane 13, is conveyed standing vertically on conveyor belt 9 into space 8 between plates 1 and 2 until its vertical edge which is the front edge relative to the conveying direction (arrow 25) adjoins sealing means 30 which has been advanced or swivelled inward. At this point second sealing means 31 is moved out of a readiness position in which it is located for example next to plate 1 or next to plate 2 or in recess 44 in plate 1 or plate 2 in space 8 between two plates 1 and 2 so far that its seal 36 is placed with its two sealing lips 37 and 38 against the vertical edge of insulating glass pane 10 which is the rear edge relative to the conveying direction (arrow 25).

When sealing means 31 is located on plate 2, plate 2 is moved with respect to plate 1 in order to orient sealing means 31 against insulating glass pane 10.

Hereupon, if provided, plungers 20 (or pressure strip 23) are advanced relative to movable plate 2 and placed against the upper edge of insulating glass pane 10 (for resilient plungers 20 or a resilient pressure strip plate 2 is caused to approach plate 1 until plungers 20 or the pressure strip touch(es) the facing glass pane 11). Movable plate 2 can also be advanced onto stationary plate 1 so far that movable plate 2 touches adjacent glass pane 11 of insulating glass pane 10 on its edge standing on conveying means 9 from the side and supports glass pane 11 in this way in the area of its lower edge.

As soon as this has taken place, the interior of insulating glass pane 10 is sealed peripherally and actual gas exchange can begin. In doing so heavy gas can be introduced into the interior of insulating glass pane 10 via the connection (arrow 50) and/or as will be described later, by conveyor belt 9 and air or the air-gas mixture is withdrawn for example via branches 51, 52 and/or 53 in which withdrawal of air or the air gas mixture can be supported by pumping out.

With the device according to the invention insulating glass pane 10 can also be filled with heavy gas as is described below.

The heavy gas is introduced into the interior of insulating glass pane 10 preferably via a nozzle pointed at a slant upwards through connection 50 and sealing means 30. Air or the air-gas mixture emerges over the entire height of the gap on the vertical edge of insulating glass pane 10 which is the rear edge relative to the conveying direction (arrow 25), between the glass pane adjacent to movable plate 2 and the spacer frame which is attached to the other glass pane adjacent to stationary plate 1. Air or the air-gas mixture enters the channel formed on one side by seal 36 of sealing means 31 and on the other side by the edge of insulating glass pane 10 (over the entire height of the channel which essentially corresponds to the height of insulating glass pane 10) and flows out upwards from this channel. The aforementioned channel is therefore formed from the space between seal 36 on the one hand and the rear, vertical edge joint of insulating glass pane 10 which is still open to the interior of insulating glass pane 10.

This manner of operation is especially advantageous since due to the large exit cross section the flow speed with which the air or air-gas mixture emerges from the interior of insulating glass pane 10 is slow so that turbulence and nozzle effects which impair an orderly filling process are reduced or prevented.

If desired, the air or air-gas mixture emerging in the described manner of operation via the channel can be captured by a suction device assigned to the upper end of the described channel and disposed of or can be reprocessed in order to recover heavy gas for use for another gas exchange.

It goes without saying that in the above described working technique in the filling of insulating glass pane 10 with heavy gas connections 51, 52, and 53 are not essential for the removal of air or the air-gas mixture. In addition, there are no transverse crosspieces of the above described type in this working technique in seal 36 of sealing means 31 between sealing lips 37 and 38.

In the described manner of operation it is not disadvantageous even if in seal 36 of sealing means 30 there are no transverse crosspieces so that heavy gas can also enter the interior of insulating glass pane 10 via the channel formed in the area of sealing means 31 by its seal 36 and the adjacent edge of insulating glass pane 10, or, assuming a corresponding nozzle (see below), air or the air-gas mixture can emerge and flow away. In spite of this, it is preferred that seal 36 of sealing means 30 in the working technique just described has the aforementioned crosspieces which at least hinder the outflow of air or the air-gas mixture in the area of the edge of insulating glass pane 10 which is the front edge relative to the conveying direction (arrow 25).

If, as described above the filling process is executed without there being special connection 51, 52, or 53 for the removal of air or the air-gas mixture, therefore the air or the air-gas mixture is removed through the channel in the area of sealing means 31, it is recommended when in the area of connection 50 for supply of heavy gas into the interior of insulating glass pane 10 there is a nozzle which projects into the interior of insulating glass pane 10, with an outlet which flares (slow outflow speed) and with an outlet which is pointed preferably obliquely upward.

As soon as the desired degree of filling in the interior of insulating glass pane 10 (for noise protection roughly 50%, for complete thermal protection at least 90% heavy gas in the interior of insulating glass pane 10) has been reached, heavy gas supply is interrupted and insulating glass pane 10 is pressed preferably in the device after two sealing means 30, 31 have been removed from intermediate space 8 between plates 1 and 2. If sealing means 30 and 31 are made so narrow that they are narrower than insulating glass pane 10 to be produced or can be elastically compressed (FIG. 7), they can also remain in space 8 of the device while insulating glass pane 10 is pressed by plate 2 approaching plate 1. When plate 2 approaches plate 1 glass pane 11 of insulating glass pane 10 adjacent to plate 2 is first of all placed entirely against spacer frame 14. To facilitate this motion, plate 2 can be equipped with vacuum means for fixing glass pane 11 on plate 2 (for example, suction heads or plate 2 is provided with openings to which a vacuum can be applied) and can be slightly raised (roughly 0.5 mm) in order to prevent the lower edge of glass pane 11 from sliding obliquely over conveyor belt 9. To raise plate 2 for example eccentric cams can be provided which are assigned to the lower edge of plate 2.

Then plate 2 is again moved away from plate 1 and insulating glass pane 10 which is filled with heavy gas and pressed ready can be moved out of the device and for example transported to a sealing device.

Below, using FIGS. 7 through 9, embodiments of sealing means 80, 30 are described which can be provided for filling of insulating glass panes 10 with heavy gas with the devices which are described using FIGS. 1 through 6 and 10 through 22 and which are formed otherwise as shown in these Figures. How the embodiment with sealing means 80, 30 according to FIGS. 7 through 9 works also corresponds, except for the differences explained below, to the description of FIGS. 1 through 6 and 10 through 22.

In the embodiment shown in FIGS. 8 and 9 sealing means 80 which is assigned to the vertical edge of the insulating glass pane to be filled which is the rear edge relative to the conveying direction (arrow 25), therefore which corresponds to movable sealing means 31 of the above described embodiments, is attached to two carriages 90, 91. Carriages 90, 91 are guided on guide rails 92, 93 provided along the upper and the lower horizontal edge of plate 2. Combined with guide rails 92, 93, i.e., contained in them (FIG. 9), are two endless belts 94 to which carriages 90, 91 are connected. On drive belts 94 there is mounted in the machine frame drive motor 95 which drives shaft 96 on which drive rollers 97, 98 are attached for belts 94. On the end opposite drive shaft 96 endless belts 94 are guided via deflection rollers which are not shown.

Carrying plate 81 of sealing means 80 formed otherwise as shown in FIG. 7 is mounted on lower carriage 93 to swivel around horizontally oriented axis 99. The upper end of carrying plate 81 can be moved using hydraulic cylinder 100 or a similar means in the direction of double arrow 101 so that sealing means 80 can be swivelled from the position shown in FIG. 9 in which it encloses an acute angle with plate 2, into a position in which it is oriented parallel to plate 2. In this case axis 99 is arranged such that carrying plate 81 or seal 85 provided on it (FIG. 7) also in the position in which sealing means 80 encloses an acute angle with plate 2 is located directly adjacent to the side of plate 2 visible in FIG. 8, i.e., the side which is facing movable plate 2 of the device.

Because sealing means 80 can swivel it can be moved along plate 2 without the sealing means or sealing strip 85 sliding on front side 102 of plate 2 in order to be placed against the vertical edge of insulating glass pane 10 which is the rear edge relative to the conveying (arrow 25).

Sealing means 30 located on the downstream side is attached in the embodiment of the device according to the invention shown in FIG. 10 on its upper and its lower end to one arm 107 at a time, which is carried via pair of parallelogram connecting rods 108, 109 which is swivel mounted in the machine frame. To move sealing means 30 into its readiness position and from the latter into its active position (FIG. 10) there is hydraulic cylinder 110 which engages lever 111. Lever 111 is connected torsionally strong to shaft 112 which connects two connecting rods 109 which are located over one another.

FIG. 10 shows that sealing means 30 in its active position does not adjoin the vertical, downstream-side edges of insulating glass pane 10, but vertical edges 105 and 106 of plates 1 and 2.

With the device according to the invention described using FIGS. 1 through 10 it is also possible to proceed such that one glass pane 11 is held on moveable plate 2 during the filling process entirely at a distance from spacer frame 14 which is seated on other glass pane 13. This is easily possible when plate 2 is set up to hold a glass pane. For example, plate 2 can have openings on its surface facing space 8 between plates 1 and 2, the openings being supplied with negative pressure to hold a glass pane securely.

The embodiment of a device of the invention shown in FIG. 11 has plate 1 which is attached via carriers in the machine frame. Opposite plate 1 is another plate 2 which is attached to the piston rods of hydraulic cylinders 5, 6 which in turn are mounted on the machine frame. By actuating hydraulic cylinders 5, 6 plate 1 can be adjusted in the direction of double arrow 7 relative to plate 1 mounted stationary in the machine frame.

On the lower edge of plate 1 is a conveyor means in the form of endless conveyor belt 9.

As the first working step in the assembly of an insulating glass pane filled with heavy gas, first glass pane 13 leaning on plate 1 and supported underneath by conveyor belt 9 is moved into space 8 between plates 1 and 2 into a stipulated end position (for example, by sealing means 30). To facilitate transport of glass pane 13, plate 1 can be formed as an air cushion wall and compressed air is delivered to it via connection line 12 as glass pane 13 is delivered.

As soon as glass pane 13 has reached its stipulated end position, adjustable plate 2 is advanced until it adjoins glass pane 13 with its surface facing plate 1. As soon as this is achieved, plate 2 which has openings on it side facing space 8 between plates 1 and 2 via line 12' is supplied with negative pressure and a negative pressure applied to plate 1 if necessary until then via line 12 (for holding glass pane 13 in the stipulated end position) is removed. Plate 2 is moved back into the position shown in FIG. 12 with glass pane 13 secured on it.

As the next step another glass plate 11 is transported with spacer 14 seated on it into space 8 between plates 1 and 2 into the stipulated end position which glass plate 13 has assumed beforehand.

By actuating hydraulic motors 5, 6 movable plate 2 with glass pane 13 held on it is advanced in the direction to stationary plate 1 until glass pane 13 is just in front of spacer 14 on glass plate 11 (distance a few mm). This position is shown in FIG. 13 in which it can be seen that glass pane 13 does not touch spacer 14 anywhere.

As soon as this position has been reached, seal 30 which was previously in a readiness position next to plate 1 is placed against the end of plates 1 and 2 which is the front end relative to the conveying direction (arrow 25 in FIG. 14). Seal 30 can also be placed against the edges of glass panes 13 and 11. If the vertical edges of glass panes 13 and 11 which are the front edges relative to the conveying direction are flush with the edges of plates 1 and 2, seal 30 adjoins both glass panes 13 and 11 as well as plates 1 and 2.

Prior to, at the same time as or after seal 30 is swivelled in, movable seal 31 is pushed from its readiness position (for example next, to adjustable plate 2, shown by a broken line in FIG. 14) in space 8 between plates 1 and 2 until it adjoins the vertical edges of glass panes 13 and 11 which are the rear edges relative to the delivery direction with its surface which is the front surface relative to the delivery direction (arrow 25).

Furthermore (if not exclusively by conveyor belt 9, therefore filled from underneath with heavy gas) nozzle 70 is swivelled in so that its opening 74 comes to rest for example in the area of the lower end of seal 30 in front of gap 60 between spacer 14 and glass plate 13 (or projects into it). The heavy gas with which insulating glass pane 10 is to be filled can be supplied to nozzle 70 via a flexible line.

Sealing means 31 which is adjustable in the conveying direction (arrow 25) can be moved on its upper and on its lower end via carriages 42 on guide rails 41, guide rails 41 being assigned to the upper and the lower edge of adjustable plate 2, for example attached to plate 2. For movement seal 31 can be removed from plate 2, for example, by tilting away (see FIGS. 8 and 9).

The position reached at this point is again shown in FIG. 15 in the viewing direction of arrow XV from FIG. 13, adjustable plate 2 not being shown. When the heavy gas is introduced, in space 8 between two glass plates 13 and 11 which is bounded by sealing means 30, 31, pool of gas 160 is formed with boundary surface 161 which migrates upward during the filling process and in doing so displaces air upward from space 8 between glass plates 13 and 11, as is symbolized in FIG. 15 by arrows 162.

Especially for larger insulating glass panes 10 heavy gas can also be supplied at several sites at the same time, as is symbolized by arrows 155 and 156 or 157 in FIG. 15. In this case it is considered that heavy gas is also supplied only at one site symbolized by arrow 150, 155, 156, and 157. Introduction of heavy gas through conveyor belt 9 is preferred (arrows 156, 157).

If heavy gas is supplied, as in indicated by arrows 156 and/or 157, it can be provided that there is at least one opening in conveyor belt 9 which is made largely gas-tight at the sites where heavy gas is to be introduced. In this case the heavy gas is supplied through at least one opening. There can also be at least one notch in conveyor belt 9 so that the heavy gas can also be blown in from the side. In this case at least one notch 30 is arranged such that it does not extend over the entire width of conveyor belt 9. By controlling the movements of conveyor belt 9, proceeding from a stipulated initial position and with consideration of the length of insulating glass pane 10 measured in the conveying direction (arrow 25) it can be easily achieved that at least one opening or notch in conveyor belt 9 comes to rest at the site on which a nozzle (symbolized by arrows 156 and/or 157) is located so that heavy gas can be introduced.

As soon as the filling process is ended, plate 2 is advanced until glass pane 13 which is supported underneath optionally by support fingers (movable) from underneath and which is secured to it lies on spacer 14.

If the device with plates 1 and 2 is designed at the same time as a press for pressing of insulating glass panes 10 flat, insulating glass pane 10 can also be equally pressed. Possible designs for this press and of the drive for moving movable press plate 2 are known from DE-31 30 645 A1 and Austrian patent application 2956/87 published on Jun. 15, 1990. The drives described there (rack-and-pinion drives or spindle drives) can be used instead of hydraulic cylinders 5, 6.

After the pressing process is completed, movable plate 2, after application of negative pressure via line 12' has been completed, is moved away from plate 1 mounted stationary in the machine frame and insulating glass pane 10 which is filled with heavy gas and ready pressed, consisting of two glass panes 11 and 12 and spacer 14 inserted in between, is removed by conveyor 9 and delivered for example to a sealing station.

It should be pointed out once again that sealing means 31 is elastically flexible in the direction perpendicularly to plates 1 and 2 in order that it not hinder plates 1 and 2 moving on top of one another and can still be moved into its sealing position (FIGS. 14 and 15).

The seals assigned to movable plate 2 in the embodiments of the lower edge shown in FIGS. 17 and 18 can be used in all embodiments which are described using FIG. 1 through 16 and 19 through 22.

In the embodiment shown in FIG. 17 there is sealing strip 170 which passes over the entire length of movable plate 2. Sealing strip 170 is carried for example by at least two hydraulic cylinders 171 and on its side facing the lower edge of plate 2 and guide strip 172 on which upper strand 173 of conveyor belt 9 slides it carries elongated seal 175. Seal 175 is formed in the embodiment shown in FIG. 17 as a hose seal and consists for example of elastically deformable plastic. To increase the sealing action seal 175, as soon as sealing strip 170 into its active position in which seal 175 adjoins the lower edge of movable plate 2 and guide strip 172, can be placed under pressure [sic].

It should be pointed out once again that guide strip 172 of conveyor means 9 on its end opposite the seal is continuously connected, for example via strip 176, to stationary plate 1 so that a gas-tight closure is ensured there.

In the embodiment shown in FIG. 18, on movable plate 2 and especially on its lower edge, elastically deformable sealing tab 180 is continuously provided which is placed against the edge of guide strip 172 of conveyor belt 9, the edge located under movable plate 2, when movable plate 2 is advanced.

Sealing tab 180 shown in FIG. 18 can also be formed as an inflatable hose seal.

An embodiment is also conceivable in which on the lower edge of movable press plate 2 a seal designed as a corrugated hose is mounted which is placed under pressure so that the seal is placed from the side and/or from the top against the edge of guide strip 172 of conveyor means 9, the edge being adjacent to movable press plate 2, as soon as movable plate 2 is located in the position in which heavy gas is introduced.

FIGS. 19 and 20 show an embodiment for an arrangement for supply of heavy gas. In this embodiment, under carrier 120 for guideway 172 of conveyor belt 9 divided lengthwise (in the example two endless toothed belts 121) of the conveyor device channel 122 which runs lengthwise is attached. From interior 123 of channel 122 holes 124 proceed which are aligned with holes 125 in carrier 120 and ultimately lead to pipe sections 126 which pass through the gap between two toothed belts 121 of conveyor belt 9. Pipe sections 126 discharge in space 8 between two plates 1 and 2 and especially between two glass panes 11 and 13 of insulating glass pane 10 which is not yet completely assembled.

Instead of openings 124, 125 and 126 via which interior 123 of channel 122 is connected to space 8 between two plates 1 and 2 (in FIG. 19 movable plate 2 during filling is in the position shown in FIGS. 13 and 14, i.e., it holds glass pane 11), there can also be a series of longitudinal slots or a continuous slot.

Interior 123 of channel 122 is connected via a connection line (not shown) to a source for heavy gas, inert gas, sulfur hexafluoride or the like.

In order to adapt the effective length of interior 123 of channel 122 via which heavy gas flows via openings 124, 125, 126 into the interior of insulating glass pane 10, i.e., space 8 between two glass panes 11 and 13, to the length of insulating glass pane 10 measured in the horizontal direction, therefore parallel to the longitudinal extension of channel 122, movable piston 130 (FIG. 21) can be contained in it. Piston 130 is sealed by two seals 131 relative to channel 122. Catch 135 which is joined to piston 130 projects to the outside through longitudinal slot 134 in the area of channel 122 which is opposite openings 124. Via this catch 135 piston 130 in channel 122 can be adjusted so that interior 123 of channel 122 has the desired length at the time, therefore the length over which heavy gas is to flow out of channel 122.

Slot 134 in channel 122 is sealed by seal 136 which is diverted to the inside in the area of piston 130, i.e. in the area between two seals 131 (unpressurized space) and is passed through under catch 135. In this way piston 130 can be optionally set without the integrity of channel 122 to the outside being adversely affected by slot 134.

It is preferred that the adjustment of piston 130 is combined via its catch 135 with adjustment of movable seal 31.

The means for introducing heavy gas with channel 122 assigned to conveyor belt 9 can be used in all the described embodiments. This especially when heavy gas is introduced only from underneath into space 8 between plates 1 and 2, therefore into insulating glass pane 10.

The invention can be applied to insulating glass panes 10 of two or more glass panes. To produce insulating glass panes consisting of three glass panes, a double pane consisting of two glass panes is produced in the conventional manner, it is covered with another spacer frame, a third glass pane is placed on it, and another filling process with heavy gas is carried out in the described manner.

Moreover, insulating glass panes can be produced from three glass panes in which only one intermediate space is filled with heavy gas.

The invention can be applied not only to flat glass panes, but also to curved glass panes, as are used for example for insulating glass panes for motor vehicles, for example, automobiles.

In summary, the invention can be described as follows:

In a device for filling with heavy gas insulating glass panes 10 which are not yet pressed there is sealing means 80 which can be moved between the plates of the device and which is movably guided via carriages 90, 91 on guide rails 92, 93 mounted on plate 2. Sealing means 80 can be swivelled by drive 100 around horizontal axis 99 so that it is can be swivelled from a position in which it encloses an acute angle with front side 102 of plate 2 in which position it is pushed along plate 2 into its active position in which it is aligned parallel to front side 102 of plate 2. The sealing means provided on the downstream-side edge of the plates can move via parallelogram connecting rods so that it can be moved from a readiness position located next to the plates into a sealing position which adjoins the vertical edges of the plates.

I claim:

1. In a device for filling an insulating glass pane (10) with heavy gas, comprising upright plates (1, 2) adapted to be located on either side of said insulating glass pane (10) to be filled, of which at least one movable plate (2) can move transversely to its plane relative to the other plate (1), conveyor means (9) for supporting lower edges of said plates (1, 2), the conveyor means being made gas-tight, and upright sealing means (30, 31, 80) adapted to seal opposite upright edges of the insulating glass pane (10), one said sealing means (31, 80) being movable parallel to the planes of the plates (1, 2) without contacting said upright edges of the insulating glass pane (10); the improvement wherein said one sealing means (31, 80) is mounted with its ends on carriages (90, 91) which can be moved parallel to the upper and lower horizontal edges of said one movable plate (2).

2. Device according to claim 1, wherein said carriages (90, 91) are attached to endless conveyor belts (94) and can be moved on guide rails (92, 93).

3. Device according to claim 1, wherein said one sealing means (31, 80) at its lower end is attached to swivel with a said carriage (91) which can move along the lower horizontal edge of movable plate (2) around an axis (99) which is parallel to the conveying direction (arrow 25), and wherein said one sealing means (31, 80) can move back and forth at its upper end onto said other plate (1).

4. Device according to claim 1, wherein said sealing means (80) is parallelepipedal and wherein said sealing means (80) comprises two carrying plates (81, 82), said carrying plates having therebetween a body (84) which can be elastically compressed, and wherein said sealing means (80) is movable with a narrow side thereof against facing edges of glass sheets (11, 13) of said insulating glass pane (10).

5. Device according to claim 4, wherein there are sealing strips (85, 87) on said narrow side of said sealing means (80).

6. Device according to claim 5, wherein one of said sealing strips is L-shaped in cross section (85) with an arm that extends over at least a part of a narrow side (90) of said body (84), said narrow side (90) facing said insulating glass pane (10).

7. Device according to claim 5, wherein said sealing strips (85, 87) project beyond said narrow side (90) of said sealing means (80), said sealing strips having surfaces capable of adjoining one of said upright edges of the insulating glass pane (10) said narrow side (90) facing said insulating glass pane (10).

8. Device according to claim 4, wherein one (81) of said two carrying plates (81, 82) has an edge (83) which projects beyond said body (84).

9. Device according to claim 4, wherein said body (84) is a body of plastic foam.

10. Device according to claim 4, wherein said sealing means (80) is attached to said carriages (90, 91) via a said carrying plate (81) which faces movable plate (2).

11. Device according to claim 5, wherein an axis (99) on the lower end of said sealing means (80) is oriented relative to said movable plate (2) such that a said movable sealing strip (85) facing said plate (2) is directly adjacent to a surface (102) of said movable plate (2), said surface facing the other said plate (1).

12. Device according to claim 1, in which said sealing means (30) on the side which is the downstream side relative to the conveying direction (arrow 25) of conveyor means (9) is movable back and forth transversely to the plane of said stationary plate (1), said sealing means (30) is movable against upright downstream-side edges (105, 106) of said two plates (1, 2).

13. Device according to claim 12, wherein said sealing means (30) is movable against said upright edges (105, 106) of said plates (1, 2*) by a swivelling motion.

14. Device according to claim 13, wherein said sealing means (30) is attached to an arm (107) which is adjustably supported via parallelogram connecting rods (108, 109) on a frame of said device.

15. Device according to claim 14, wherein on the lower and the upper end of sealing means (30) there is one arm (107) each which is supported on said frame via parallelogram connecting rods (108, 109).

16. Device according to claim 15, wherein said parallelogram connecting rods (108, 109) are coupled to a shaft (112) having a drive (110, 111) for twisting the shaft.

* * * * *